United States Patent
Inaba

(10) Patent No.: US 10,593,461 B2
(45) Date of Patent: *Mar. 17, 2020

(54) COMPOSITE MATERIAL, REACTOR, CONVERTER, AND POWER CONVERSION DEVICE

(71) Applicants: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

(72) Inventor: Kazuhiro Inaba, Osaka (JP)

(73) Assignees: Sumitomo Electric Industries, Ltd., Osaka-shi (JP); Sumitomo Wiring Systems, Ltd., Yokkaichi-shi (JP); AutoNetworks Technologies, Ltd., Yokkaichi-shi (JP)

( * ) Notice: Subject to any disclaimer, the term of this patent is extended or adjusted under 35 U.S.C. 154(b) by 269 days.

This patent is subject to a terminal disclaimer.

(21) Appl. No.: 14/428,300

(22) PCT Filed: Jul. 3, 2013

(86) PCT No.: PCT/JP2013/068275
§ 371 (c)(1),
(2) Date: Mar. 13, 2015

(87) PCT Pub. No.: WO2014/045673
PCT Pub. Date: Mar. 27, 2014

(65) Prior Publication Data
US 2015/0248963 A1    Sep. 3, 2015

(30) Foreign Application Priority Data
Sep. 21, 2012  (JP) ................................. 2012-208813

(51) Int. Cl.
*H01F 1/01* (2006.01)
*H01F 27/255* (2006.01)
(Continued)

(52) U.S. Cl.
CPC .......... *H01F 27/255* (2013.01); *B22F 1/0007* (2013.01); *H01F 1/01* (2013.01);
(Continued)

(58) Field of Classification Search
None
See application file for complete search history.

(56) References Cited

U.S. PATENT DOCUMENTS 9,349,511 B2 *  5/2016  Inaba .................... H01F 1/26
9,847,156 B2 * 12/2017  Inaba .................... H01F 1/26
(Continued)

FOREIGN PATENT DOCUMENTS

CN     1938793 A    3/2007
EP     2481502 A1   8/2012
(Continued)

OTHER PUBLICATIONS

Machine translation of JP2008-147405A, Jun. 2008.*
(Continued)

*Primary Examiner* — Xiaowei Su
(74) *Attorney, Agent, or Firm* — Baker Botts L.L.P.; Michael A. Sartori

(57) ABSTRACT

There is provided a composite material containing magnetic powder and a polymeric material including the powder in a dispersion state, wherein a content of the magnetic powder with respect to the whole composite material is more than 50% by volume and 75% by volume or less, a saturation magnetic flux density of the composite material is 0.6 T or more, and a relative magnetic permeability of the composite material is more than 20 and is 35 or less. It is preferable that (Continued)

a density ratio of the magnetic powder should be 0.38 or more and 0.65 or less. The density ratio is set to be an apparent density/a true density. Moreover, it is preferable that the magnetic powder should include a plurality of particles constituted of the same material.

10 Claims, 5 Drawing Sheets

(51) Int. Cl.
    *B22F 1/00*     (2006.01)
    *H01F 1/26*     (2006.01)
    *H01F 37/00*     (2006.01)
    *H02M 7/537*     (2006.01)

(52) U.S. Cl.
CPC ............... *H01F 1/26* (2013.01); *H01F 37/00* (2013.01); *H02M 7/537* (2013.01); *B22F 1/0059* (2013.01); *C22C 2202/02* (2013.01)

(56) References Cited

U.S. PATENT DOCUMENTS

| | | | |
|---|---|---|---|
| 2009/0123716 A1 | 5/2009 | Ohmi | |
| 2009/0191421 A1 | 7/2009 | Huang et al. | |
| 2013/0294129 A1* | 11/2013 | Inaba | H01F 1/26 363/131 |
| 2015/0248963 A1 | 9/2015 | Inaba | |

FOREIGN PATENT DOCUMENTS

| | | |
|---|---|---|
| JP | 2000-294418 A | 10/2000 |
| JP | 2006-269134 A | 10/2006 |
| JP | 2008-147403 A | 6/2008 |
| JP | 2008-147405 A | 6/2008 |
| JP | 2010-283379 A | 12/2010 |

OTHER PUBLICATIONS

Machine translation of JP 2011-192729A. (Year: 2011).*
Notification of the First Office Action in counterpart Chinese Patent Application No. 201380047937.8, dated Aug. 29, 2016.
International Search Report issued in PCT International Application No. PCT/JP2013/068275 dated Oct. 15, 2013.
Office Action in Japanese Patent Application No. 2012-208813, dated Apr. 8, 2016.
Extended European Search Report in European Patent Application No. 13839085.1, dated May 12, 2016.
Notification of Reasons for Refusal issued in counterpart Japanese Patent Application No. 2012-208813, dated Nov. 22, 2016.
Notification of the Second Office Action issued in counterpart Chinese Patent Application No. 201380047937.8, dated Apr. 28, 2017.
Office Action dated Dec. 26, 2018 issued for the Divisional U.S. Appl. No. 15/786,861.

* cited by examiner (A)

(B)

(A)

(B)

COMPOSITE MATERIAL, REACTOR, CONVERTER, AND POWER CONVERSION DEVICE

TECHNICAL FIELD

The present invention relates to a composite material suitable as a material constituting a magnetic part such as a reactor or the like, a reactor including a magnetic core formed of the composite material, a converter including the reactor, and a power conversion device including the converter. In particular, the present invention relates to a reactor capable of reducing a loss and having a small number of components, and a composite material which is suitable for the reactor.

BACKGROUND ART

A magnetic part including a coil and a magnetic core having the coil disposed thereon, for example, a reactor or a motor is used in various fields. For example, Patent Literature 1 discloses a reactor used as a circuit component of a converter or the like mounted on a vehicle such as a hybrid electric vehicle. Patent Literature 1 discloses, as a material constituting the magnetic core provided in the reactor, a composite material constituted of magnetic powder such as pure iron powder and a resin (binder) containing the powder. The composite material can be manufactured by filling a molding die of a desirable shape or the like with a mixture obtained by mixing magnetic powder and an uncured liquid resin which are raw materials, and then curing the resin.

CITATION LIST

Patent Literature

Patent Literature 1: Japanese Patent No. 4,692,768

SUMMARY OF INVENTION

Technical Problem

It is desirable that a loss should be small as a desired characteristic for the magnetic core. From a viewpoint of productivity of a magnetic part such as a reactor, moreover, it is desirable that the number of components should be small. Accordingly, it is desirable that the magnetic core should include the small number of components.

According to Patent Literature 1, a gap is not provided by constituting the magnetic core using the composite material. Thus, a gap material can be omitted and the number of components can be reduced. In Patent Literature 1, the composite material is set to have a relative magnetic permeability of 11 or less in order to prevent a gap from being provided. Since the relative magnetic permeability is low, thus, there is a possibility that a magnetic flux might leak, resulting in a loss due to the leakage of the magnetic flux.

Therefore, an object of the present invention is to provide a reactor capable of reducing a loss and having a small number of components. Moreover, another object of the present invention is to provide a composite material which is suitable for building the reactor.

Still another object of the present invention is to provide a converter including the reactor and a power conversion device including the converter.

Solution to Problem

The present invention particularly achieves the object by setting the relative magnetic permeability of the composite material into a specific range.

The composite material according to the present invention contains magnetic powder and a polymeric material including the powder in a dispersion state, and a content of the magnetic powder with respect to the whole composite material is more than 50% by volume and 75% by volume or less, a saturation magnetic flux density of the composite material is 0.6 T or more, and a relative magnetic permeability of the composite material is more than 20 and 35 or less. A method of measuring the saturation magnetic flux density and the relative magnetic permeability will be described in a test example which will be explained later.

Since the composite material according to the present invention has the relative magnetic permeability of 35 or less which is comparatively low, magnetic flux saturation occurs with difficulty. For this reason, it is possible to reduce a gap material and an air gap, and more preferably, to omit the gap material or the like by using the composite material according to the present invention in a magnetic core of a magnetic part such as a reactor. Accordingly, it is possible to contribute to reduction in the number of components for the magnetic part such as the reactor. Moreover, the composite material according to the present invention has the relative magnetic permeability which is more than 20. In the case where the composite material is used for the magnetic core of the magnetic part such as the reactor, therefore, a magnetic flux created by a coil leaks with difficulty. By using the composite material according to the present invention in the magnetic core of the magnetic part such as the reactor, therefore, it is possible to reduce a loss and to contribute to reduction in the loss in the magnetic part such as the reactor. Furthermore, the composite material according to the present invention has the content of the magnetic powder which is which is more than 50 volume %. For this reason, the proportion of a magnetic component is sufficiently high. Therefore, the composite material according to the present invention can have a saturation magnetic flux density which is enhanced and is 0.6 T or more. Since the content of the magnetic powder is 75% by volume or less, in manufacture, a mixture containing the magnetic powder and a polymeric material which are raw materials of the composite material can easily flow so that composite materials having various shapes can be formed with high precision. Accordingly, the composite material according to the present invention is also excellent in productivity. Moreover, the composite material according to the present invention is also excellent in form accuracy and dimensional precision.

In the case where the material of the magnetic powder has a saturation magnetic flux density of approximately 2 T (for example, pure iron, a Fe—Si alloy or the like), particularly, the content of the magnetic powder is more than 50% by volume so that the saturation magnetic flux density of the composite material is easily set to be 1.0 T or more. In this case, if the content of the magnetic powder is 55% by volume or more, the saturation magnetic flux density of the composite material is set to be 1.1 T or more. It is more preferable that the content of the magnetic powder in the composite material should be 55% by volume or more and 70% by volume or less.

There may be an aspect of the composite material according to the present invention, in which a density ratio of the magnetic powder is 0.38 or more and 0.65 or less. The density ratio is set to be an apparent density/true density. The apparent density is obtained based on JIS Z 2504 (2000) "Metallic powders—Determination of apparent density". The true density indicates a density at which only a volume occupied by a substance is set to be a density calculating volume. In the case where an inner part of each particle constituting the magnetic powder has no cavity, the true density is equal to a specific gravity of a material (for example, a metal such as pure iron) constituting the magnetic powder.

The composite material according to the aspect can be manufactured by utilizing, in the raw material, magnetic powder satisfying a density ratio which is 0.38 or more and 0.65 or less, for example. By using the specific raw material, it is possible to manufacture the composite material according to the present invention which satisfies a specific relative magnetic permeability and a specific saturation magnetic flux density without applying a high pressure in molding. According to the aspect, therefore, productivity is excellent. By using powder having a high apparent density within a range satisfying the density ratio, moreover, it is possible to raise a packing density. By using powder having an apparent density satisfying the density ratio of 0.65 or less, furthermore, it is possible to suppress an electrical connection through a contact of the particles of the magnetic powder as greatly as possible, thereby suppressing the relative magnetic permeability of the composite material at a low value. As a result, it is possible to implement a comparatively low relative magnetic permeability while setting a comparatively high saturation magnetic flux density.

There may be an aspect of the composite material according to the present invention, in which the magnetic powder includes a plurality of particles constituted of the same material.

The magnetic powder is constituted of a particle of a single material. Therefore, it is sufficient that one type of magnetic powder is used as the raw material of the composite material.

There may be an aspect of the composite material according to the present invention, in which the magnetic powder is constituted of the single material, the magnetic powder is iron powder and an apparent density of the iron powder is 3.0 g/m$^3$ or more and 5.0 g/cm$^3$ or less.

The pure iron has a higher saturation magnetic flux density than a Fe—Si alloy or the like. For this reason, in the aspect, the saturation magnetic flux density is apt to be increased. Moreover, the pure iron has a true density of 7.874 g/cm$^3$. For this reason, in the case where the apparent density of the pure iron satisfies the range, the iron powder satisfies the density ratio which is 0.38 or more and 0.65 or less. According to the aspect, therefore, the saturation magnetic flux density is high, and furthermore, the composite material tends to have a relative magnetic permeability which is more than 20 and 35 or less as described above, and productivity is also excellent.

There may be an aspect of the composite material according to the present invention, in which the magnetic powder contains powder constituted of a plurality of materials having different relative magnetic permeabilities from each other. If the composition of the magnetic substance differs, the relative magnetic permeability is usually varied. In the aspect, accordingly, the relative magnetic permeability is used as an index of the difference between the compositions of the magnetic substance.

In the aspect, there are contained magnetic powder formed of a plurality of materials having different relative magnetic permeabilities from each other, that is, magnetic powder having a high relative magnetic permeability and magnetic powder having a comparatively low relative magnetic permeability. Therefore, it is possible to have characteristics of the respective powder together. More specifically, the magnetic substance having the high relative magnetic permeability typically has a high saturation magnetic flux density, and furthermore, the magnetic substance having the low magnetic permeability typically has a high electric resistivity. Therefore, it is possible to reduce an eddy current loss. In the aspect, accordingly, the high saturation magnetic flux density and the low loss can be more easily compatible with each other as compared with the case where magnetic powder formed of a single material is contained. In the aspect in which the magnetic substance having the low relative magnetic permeability is contained, moreover, a saturation of a magnetic flux occurs with difficulty. For this reason, a gap member or the like can further be reduced easily. In addition, in the case where a composite material having a high saturation magnetic flux density and a low loss is manufactured, the eddy current loss can be reduced but it is not necessary to use very fine magnetic powder which is hard to handle, and the saturation magnetic flux density can be enhanced. However, it is not necessary to increase the content of the magnetic powder with reduction in viscosity of a mixture of raw materials. Therefore, the aspect is also excellent in productivity.

There may be an aspect of the composite material according to the present invention, in which there is a plurality of peaks when a particle size distribution of the magnetic powder is taken.

The peak takes a frequency $f_s$ of a particle diameter $r_s$ which is less than a particle diameter $r_x$ by a predetermined value k (k is a design value) and a frequency $f_L$ of a particle diameter $r_L$ which is more than the particle diameter $r_x$ by the predetermined value k (k is the design value), the frequency $f_x$ being 1.1 times or more as great as the frequency $f_s$ and being 1.1 times or more as great as the frequency $f_L$ when having the frequency $f_x$ of the particle diameter $r_x$ having a particle size distribution.

The composite material according to the present invention can be manufactured by mixing magnetic powder and a polymeric material such as a resin or rubber which are raw materials to prepare a mixture, filling a predetermined molding die with the mixture and then curing the polymeric material. By the manufacturing method, a shape or a diameter of a particle of the magnetic powder used for the raw material is not changed substantially before and after the manufacture. For this reason, the particle size distribution of the magnetic powder in the composite material is substantially equal to that of the magnetic powder used for the raw material.

The presence of a plurality of peaks in the particle size distribution indicates that a peak (a high frequency value) is present in a point having a small particle diameter and a point having a large particle size in a histogram of the particle size distribution. In other words, at least two peaks: a first peak and a second peak are present, and when a particle size having the first peak is represented by $r_1$ and a particle size having the second peak is represented by $r_2$, a particle diameter $r_1$ is less than a particle diameter $r_2$ ($r_1<r_2$). The aspect in which the plurality of peaks is present includes both fine magnetic powder and coarse magnetic powder at a high frequency. By including the fine magnetic powder in a comparatively large amount, the aspect can reduce an eddy current loss, resulting in a small loss. By using mixed powder containing the fine powder and the coarse powder for the raw material, moreover, it is possible to easily enhance a packing density of the magnetic powder. Consequently, it is possible to obtain a composite material having a high proportion of a magnetic component. In the aspect, accordingly, the saturation magnetic flux density is high. Furthermore, it is possible to easily enhance the packing density by utilizing the mixed powder. For this reason, it is not necessary to use only very fine powder which is hard to handle. Thus, it is possible to utilize powder having such a size as to be easily handled. In the aspect, therefore, the magnetic powder to be used for the raw material is easily handled and the productivity is also high. In addition, with the use of the mixed powder for the raw material, the mixture with the polymeric material has fluidity enhanced. For this reason, even a composite material having a complicated shape can be molded with high precision. In this respect, the aspect is excellent in the productivity. In the aspect, the saturation magnetic flux density is enhanced if the magnetic powder is constituted of a single material and the single material is pure iron, and the eddy current loss can be reduced if the single material is an iron alloy.

In addition, the presence of the peaks in the particle size distribution is determined whether the peaks are present in the whole magnetic powder or not regardless of the number of the materials of the magnetic powder. More specifically, the following cases are included.

(A) Magnetic powder such as pure iron or an iron alloy is constituted of a single material, and a plurality of peaks is seen in the particle size distribution.

(B) Magnetic powder constituted of different types of materials, for example, pure iron and an iron alloy are included, and a single peak is seen in a particle size distribution of a certain material (for example, the pure iron) and a single peak is seen in a particle size distribution of another material (for example, the iron alloy). However, particles sizes to be mutual peaks are shifted from each other.

(C) The magnetic powder constituted of different types of materials, for example, pure iron and an iron alloy are included and a plurality of peaks is seen in each of particle size distributions of a certain material (for example, pure iron) and the other material (for example, an iron alloy). In this case, the peaks for the certain material (for example, the pure iron) and the peaks for the other material (for example, the iron alloy) may overlap with each other or may be shifted from each other.

(D) The magnetic powder formed of different types of materials, for example, iron pure and an iron alloy are included, and a single peak is seen in a particle size distribution for a certain material (for example, the pure iron) and a plurality of peaks is seen in a particle size distribution for the other material (for example, the iron alloy). In this case, the single peak for the certain material (for example, the pure iron) and the single peak for the other material (for example, the iron alloy) may overlap with each other or may be shifted from each other.

There may be an aspect of the composite material according to the present invention, in which a degree of circularity of a particle constituting the magnetic powder is 0.1 or more and 2.0 or less. A method of measuring the degree of circularity will be described later.

For example, the composite material according to the aspect can be manufactured by utilizing, for a raw material, the magnetic powder constituted of the particle satisfying the specific degree of circularity. The magnetic powder is excellent in fluidity, and furthermore, can fully form a clearance in which another particle can be interposed between the particles satisfying the specific degree of circularity. By using the specific raw material, accordingly, it is possible to easily enhance the packing density of the magnetic powder. The composite material thus obtained has a high proportion of a magnetic component and a high saturation magnetic flux density. From the foregoing, in the aspect, a composite material having a high saturation magnetic flux density can easily be obtained, and furthermore, productivity is also high. The degree of circularity is preferably 1.0 or more and 1.5 or less, and is further preferably 1.0 or more and 1.3 or less.

The composite material according to the present invention can be suitably utilized for a magnetic core of a magnetic part, for example, a magnetic core of a reactor provided in a converter or the like which is to be mounted on a vehicle such as a hybrid electric vehicle. As the reactor according to the present invention, therefore, there is proposed a reactor which includes a coil and a magnetic core and has at least a part of the magnetic core constituted of the composite material according to the present invention.

The reactor according to the present invention has at least a part of the magnetic core which is constituted of the composite material according to the present invention. Consequently, it is possible to produce special advantages. More specifically, (1) a gap member or the like can be reduced, and preferably, can be omitted so that the number of the components is small, (2) a magnetic flux created by a coil is hard to leak to an outside of the magnetic core so that a loss can be reduced, (3) it is possible to include a magnetic core having a saturation magnetic flux density of 0.6 T or more, and (4) magnetic cores having various shapes can be manufactured with high precision, and productivity is also high.

As the reactor according to the present invention, alternatively, there is proposed a reactor which includes a coil and a magnetic core and has the whole magnetic core constituted of the composite material according to the present invention.

The reactor also produces the advantages (1) to (4) described above. In particular, a relative magnetic permeability of the whole magnetic core is more than 20 and 35 or less. Therefore, the gap member or the like can further be reduced, and preferably, can be omitted. In manufacture of the magnetic core, moreover, it is sufficient to manufacture only the composite material. As compared with the case where a magnetic core including a powder compact or the like in combination is manufactured, a manufacturing process can be simplified. Accordingly, the rector according to the aspect can further reduce the number of the components and enhance the productivity.

The reactor according to the present invention can be suitably utilized for the component of the converter. As the converter according to the present invention, therefore, a converter including the reactor according to the present invention is proposed.

If the converter according to the present invention includes the reactor according to the present invention which has a small number of components and can reduce a loss, the productivity is high and a low loss is obtained.

The converter according to the present invention can be suitably utilized for the component of the power conversion device including a converter and an inverter. As the power conversion device according to the present invention, therefore, a power conversion device including the converter according to the present invention is proposed.

If the power conversion device according to the present invention includes, as a component, the reactor according to the present invention which has a small number of components and can reduce a loss, the productivity is high and a low loss is obtained.

Advantageous Effects of Invention

The reactor according to the present invention includes a small number of components and can reduce a loss. The composite material according to the present invention can build a magnetic core of the reactor which includes a small number of components and can reduce a loss.

DESCRIPTION OF EMBODIMENTS

Figure 1:
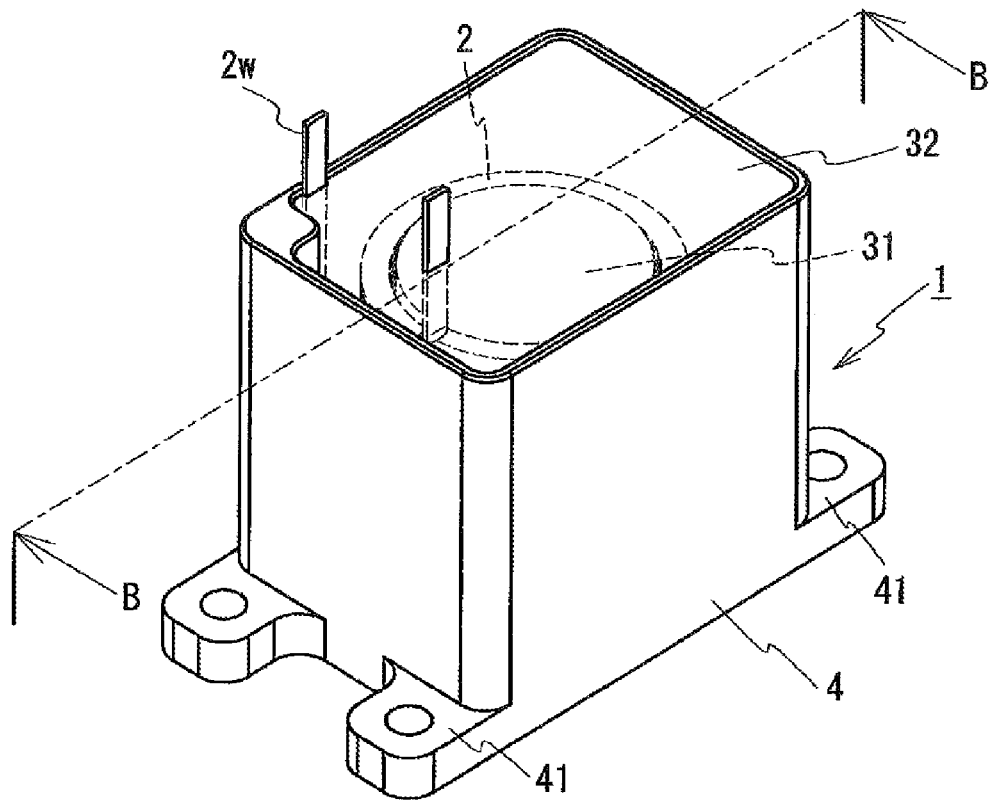
FIG. 1(A) is a brief perspective view showing a reactor according to a first embodiment and FIG. 1(B) is a cross-sectional view showing the reactor taken along line B-B.
Figure 1:
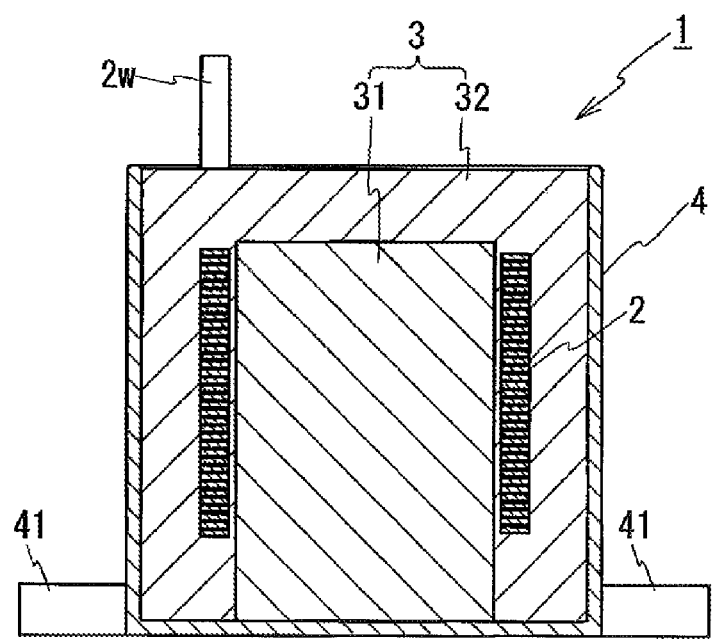

Embodiments of the present invention will be specifically described below with reference to the drawings. Like reference signs refer to like members in the drawings.

First Embodiment

Figure 2:
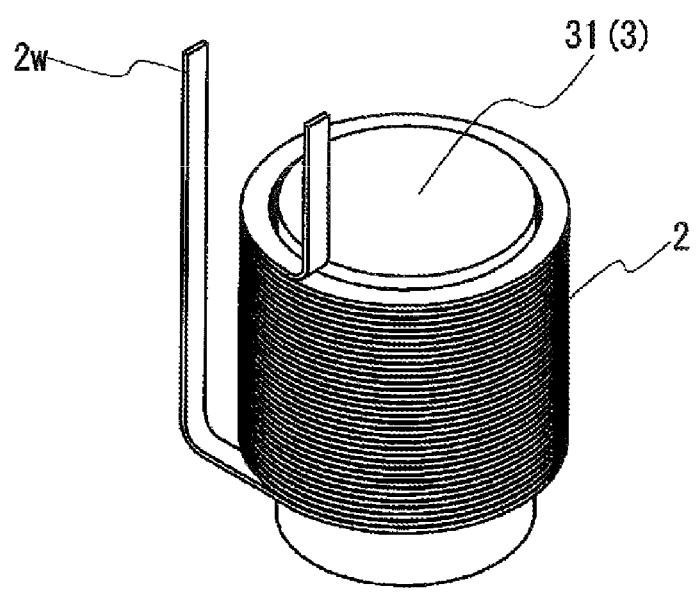
FIG. 2 is a perspective view showing an assembly of a coil and an inner core which are provided in the reactor according to the first embodiment.

With reference to FIGS. 1(A), 1(B), and 2, a reactor 1 according to a first embodiment will be described. The reactor 1 includes a single cylindrical coil 2 obtained by spirally winding a wire 2w, and a magnetic core 3 disposed on an inside and an outside of the coil 2 and forming a closed magnetic circuit. In this example, an assembly of the coil 2 and the magnetic core 3 is accommodated in a case 4. A feature of the reactor 1 is a component of the magnetic core 3. More specifically, at least a part of a portion disposed on the inside of the coil 2 in the magnetic core 3 is made of a powder compact, and at least a part of a portion disposed on the outside of the coil 2 is made of a specific composite material. The magnetic core 3 will be described below in detail and subsequently the other components will be described.

[Magnetic Core]

The magnetic core 3 is a member for forming paths of a magnetic flux when the coil 2 is energized. As shown in FIG. 1(B), the magnetic core 3 according to this example includes a columnar inner core 31 having at least a part disposed on the inside of the coil 2 and covered with the coil 2, and an outer core 32 disposed on the outside of the coil 2 and formed to substantially cover a part of the inner core 31 and a cylindrical outer peripheral surface of the coil 2. A material constituting the inner core 31 and a material constituting the outer core 32 are different from each other. More specifically, the inner core 31 is made of a powder compact and the outer core 32 is constituted of a composite material containing magnetic powder and a polymeric material including the powder in a dispersion state. In the reactor 1, one of features is that the composite material has a relative magnetic permeability which is more than 20 and 35 or less.

{Inner Core}

The inner core 31 according to this example is a columnar member along with an inner peripheral shape of the cylindrical coil 2. It is possible to properly select sectional and external shapes of the inner core 31. For example, the inner core 31 may have a prism shape such as a rectangular-parallelepiped shape, an ellipsoid shape, or the like and may have a similar shape to an inner peripheral shape of the coil 2, and furthermore, a non-similar shape. The inner core 31 according to this example is assumed to be a solid element in which neither a gap member such as an alumina plate nor an air gap is interposed.

When a length in an axial direction of the coil 2 (a vertical direction in FIG. 1(B)) is referred to as a length of the inner core 31 or a length of the coil 2, the length of the inner core 31 according to this example is greater than the length of the coil 2 shown in FIG. 1(B). Moreover, the inner core 31 is accommodated in the case 4 such that one end surface (a surface disposed on an opening side of the case 4 in FIG. 1(B)) is almost flush with an end surface of the coil 2 and the other end surface (a surface disposed on a bottom surface side of the case 4 in FIG. 1(B)) and a vicinity thereof is protruded more than the other end surface of the coil 2. Regarding the reactor 1, accordingly, in the magnetic core 3, a portion disposed on the inside of the cylindrical coil 2 is formed of a powder compact constituting a part of the inner core 31, and a portion disposed on the outside of the coil 2 is formed of a powder compact constituting the other part of the inner core 31 and a composite material constituting the outer core 32.

It is possible to properly select a protrusion length of the inner core 31. Herein, there is employed a configuration in which only the other end surface side of the inner core 31 is protruded more than the other end surface of the coil 2. However, it is also possible to employ a configuration in which each end surface of the inner core 31 is protruded more than each end surface of the coil 2. At this time, it is also possible to employ any configurations in which the protrusion lengths are equal to each other or different from each other. Alternatively, it is possible to employ a configuration in which the length of the inner core 31 and that of the coil 2 are equal to each other, that is, a configuration in which each end surface of the inner core 31 and that of the coil 2 are flush with each other. For example, it is possible to employ a configuration in which in the magnetic core 3, only a portion disposed on the inside of the coil 2 is made of a powder compact, and a whole portion disposed on the outside of the coil 2 is made of a composite material. All of the configurations described above include the composite material such that a closed magnetic circuit is formed when the coil 2 is energized.

The powder compact can typically be obtained by molding and then burning magnetic powder constituted of a magnetic particle, coating magnetic powder including a magnetic particle and an insulating coating formed on a surface thereof, and mixed powder having a binder mixed properly in addition to these powder. In the case where the coating magnetic powder is used for a raw material, the burning is carried out at a heat-resistance temperature of the insulating coating or less. Examples of the insulating coating in the coating magnetic powder of the raw material include a phosphate compound, a silicone resin and the like. The insulating coating in the raw material remains intact after the burning in some cases and is changed into a compound which will be described later or the like by the burning in the other cases. By regulating a material of the magnetic particle, a mixture ratio of the magnetic powder and the binder, and amounts of various coatings containing the insulating coating, and adjusting a molding pressure in the manufacture of the powder compact, it is possible to change a magnetic characteristic of the powder compact. For example, when magnetic powder constituted of a material having a high saturation magnetic flux density is used, a blending amount of the binder is reduced to enhance a proportion of a magnetic component, or a molding pressure is raised, a powder compact having a high saturation magnetic flux density is obtained. The powder compact can easily be molded even when it is in a relatively complicated three-dimensional shape, and thus high productivity is exhibited.

Examples of the material of the magnetic particle include an iron-base material, for example, an iron group metal such as Fe, Co or Ni (pure iron made of Fe and inevitable impurities, for instance), an iron alloy containing Fe as a principal component (a Fe—Si based alloy, a Fe—Ni based alloy, a Fe—Al based alloy, a Fe—Co based alloy, a Fe—Cr based alloy, a Fe—Si—Al based alloy or the like), a rare earth metal alloy, and a soft magnetic material such as ferrite to be an iron oxide. In particular, with the iron-base material, it is easier to obtain a powder compact having a higher saturation magnetic flux density than the ferrite. Examples of a material constituting an insulating coating formed at the powder compact include a phosphate compound, a silica compound, a zirconium compound, an aluminum compound, a boron compound and the like. Examples of the binder include a thermoplastic resin, a non-thermoplastic resin, higher fatty acid and the like. The binder may disappear due to the burning described above or may change into an insulator such as silica. In connection with the powder compact, an insulator such as an insulating coating is present between the magnetic particles so that the magnetic particles are insulated from each other. Accordingly, even in the case where the coil is energized with high-frequency power, an eddy current loss is small. In the case where the magnetic particle is formed of a metal, the insulating coating can reduce the eddy current loss if any. In the case where the magnetic particle is formed of an insulator such as ferrite, the insulating coating does not need to be included. It is possible to utilize the powder compact which is well known.

It is possible to properly select a saturation magnetic flux density or a relative magnetic permeability of the inner core 31. In the case where a constant magnetic flux is to be obtained, it is possible to decrease at least a sectional area of a portion covered with the coil 2 (an area of a portion through which a magnetic flux passes) as an absolute value of the saturation magnetic flux density in at least a portion covered with the coil 2 in the inner core 31 is greater and the saturation magnetic flux density of at least the portion covered with the coil 2 in the inner core 31 is relatively more than that of the outer core 32. For this reason, it is possible to reduce a size of the reactor 1 having a high saturation magnetic flux density of the inner core 31 (it is possible to decrease a volume thereof). Accordingly, it is preferable that the saturation magnetic flux density of at least the portion covered with the coil 2 in the inner core 31 should be 1.6 T or more, should further be 1.8 T or more and should particularly be 2 T or more, and should be at least 1.2 times or more as great as the saturation magnetic flux density of the outer core 32, should further be at least 1.5 times or more as great as that, and should particularly be at least 1.8 times or more as great as that, all of which have no upper limit. When a lamination product of electromagnetic steel sheets represented by a silicon steel sheet is utilized for the material constituting the inner core 31 in place of the powder compact, the saturation flux density of the inner core 31 can easily be further enhanced.

Herein, the powder compact constituting the inner core 31 is formed of soft magnetic metal powder including a coating such as an insulating coating, and has a magnetic flux density which is 1.6 T or more and a relative magnetic permeability which is 100 or more and 500 or less.

[Outer Core]

The outer core 32 according to this example is a solid element which is provided to generally cover the outer periphery of an assembly (FIG. 2) of the coil 2 and the inner core 31 and in which neither a gap member nor an air gap is interposed. In detail, the outer core 32 is formed to cover both end surfaces and an outer peripheral surface in the coil 2, and one end surface and an outer peripheral surface on the other end surface side in the inner core 31, and as shown in FIG. 1(B), its cross-sectional shape taken along the axial direction of the coil 2 is an inverted U-shape. The outer core 32 and a part of the inner core 31 are bonded to each other by a polymeric material in the outer core 32 to form a closed magnetic circuit, and furthermore, to configure the integral magnetic core 3. In other words, the magnetic core 3 according to this example does not have another member such as an adhesive interposed between the inner core 31 and the outer core 32.

The outer core 32 can have any shape if the closed magnetic circuit can be formed. For example, it is possible to employ a configuration in which a part of the outer periphery of the coil 2 is not covered with the composite material constituting the outer core 32. Referring to a horizontal configuration which will be described later (a fifth embodiment), it is possible to easily manufacture a configuration in which a part of the outer periphery of the coil 2 is exposed from the composite material.

Magnetic Powder

Examples of the material of the magnetic powder in the composite material include the iron base material such as an iron group metal, for example, pure iron or an iron alloy, a metal such as a rare earth metal alloy, and a soft magnetic material such as a compound (a nonmetal), for example, ferrite. The magnetic powder constituting the composite material may be of the same type as the magnetic powder of the powder compact constituting the inner core 31 or may contain powder formed of different types of materials.

An exemplary pure iron may be pure iron containing Fe in 99.5% by mass or more and inevitable impurities in a residual part. The pure iron has a high saturation magnetic flux density. For this reason, a composite material containing pure iron powder tends to have a saturation magnetic flux density increased with a rise in a content proportion of the pure iron powder. By utilizing the composite material, it is possible to easily obtain a magnetic core having a high saturation magnetic flux density. For example, it is possible to employ a composite material in which magnetic powder contains the largest amount of pure iron powder or a composite material in which all of magnetic powder is constituted of pure iron powder.

Herein, magnetic powder can contain coating powder including a magnetic particle and an insulating coating covering an outer periphery of the magnetic particle. In a composite material containing the coating powder, the insulating coating is interposed between the magnetic particles and the magnetic particles can be insulated from each other. For this reason, the composite material containing the coating powder can easily reduce an eddy current loss. By utilizing the composite material, it is possible to readily obtain a magnetic core having a low loss. As a content proportion of the coating powder in the magnetic powder is increased, the eddy current loss can be reduced so that a magnetic core having a low loss can easily be obtained. Examples of an insulating material constituting the insulating coating include phosphate, a silicone resin, metal oxide, metal nitride, metal carbide, a metal phosphate compound, a metal borate compound, a metal silicate compound and the like. Examples of a metal element included in the oxide, a compound such as a metal salt compound include Fe, Al, Ca, Mn, Zn, Mg, V, Cr, Y, Ba, Sr, a rare earth element (excluding Y) and the like. The listed material is a nonmagnetic material and includes an insulating coating constituted of the non-magnetic material, thereby suppressing an increase in a relative magnetic permeability. It is preferable that pure iron powder should be the coating powder because the eddy current loss can be reduced as described above. If iron ally powder which will be described below is set to be the coating powder, the eddy current loss can be reduced more easily, and furthermore, the relative magnetic permeability can readily be decreased.

Examples of the iron alloy include an alloy containing at least one element selected from Si, Ni, Al, Co and Cr as an additive element in an amount which is 1.0% by mass or more and 20.0% by mass or less in total. More specifically, examples of the iron alloy include a Fe—Si based alloy, a Fe—Ni based alloy, a Fe—Al based alloy, a Fe—Co based alloy, a Fe—Cr based alloy, a Fe—Si—Al based alloy and the like. The iron alloy generally has a higher electric resistance than the pure iron. In particular, the iron alloy containing Si, for example the Fe—Si based alloy or the Fe—Si—Al based alloy (Sendust) has a high electric resistivity. For this reason, the composite material containing the iron alloy powder can reduce an eddy current loss, and furthermore, has a small hysteresis loss. By utilizing the composite material, it is possible to easily obtain a magnetic core having a low loss. For example, it is possible to obtain a composite material in which all magnetic powder is constituted of iron alloy powder (preferably, iron alloy powder containing Si). In some cases in which the composite material contains iron alloy powder having different compositions, a saturation magnetic flux density is enhanced in addition to the reduction in the eddy current loss.

The magnetic powder in the composite material may be constituted of the single material (only the pure iron powder or the like) as described above. Alternatively, the magnetic powder in the composite material can contain powder constituted of a plurality of materials having different relative magnetic permeabilities. For example, there are employed a configuration including pure iron powder and iron alloy powder and a configuration including iron alloy powder having a plurality of different compositions. In the former configuration, the saturation magnetic flux density can be enhanced by containing the pure iron powder and the eddy current loss can be reduced by containing the iron alloy powder. By utilizing the composite material, accordingly, it is possible to easily obtain a magnetic core having a high saturation magnetic flux density and a low loss. In this configuration, as a content of the pure iron powder is increased, the saturation magnetic flux density can be enhanced. For this reason, in the case where an enhancement in the saturation magnetic flux density is desired, the magnetic powder preferably contains the pure iron powder in the largest amount, and more preferably contains the majority of the pure iron powder. In the latter configuration, all of the magnetic powder is the iron alloy powder. Therefore, the eddy current loss can be reduced. By utilizing the composite material, it is possible to easily obtain a magnetic core having a low loss. By regulating the composition of the iron alloy, it is also possible to enhance the saturation magnetic flux density.

A particle constituting the magnetic powder may have an optional shape such as a spherical shape and a non-spherical shape (for example, a plate shape, a needle shape, a rod shape or the like, other different shapes). The magnetic powder used in the raw material as described above and the magnetic powder in the composite material have shapes or sizes which are substantially equal to each other. By using magnetic powder having a desirable particle shape in the raw material, therefore, it is possible to obtain a composite material containing the magnetic powder having the desirable particle shape (in which a degree of circularity to be described later satisfies a specific range, for example).

If the shape of the particle constituting the magnetic powder is close to the spherical shape, a clearance in which another particle (preferably, a finer particle than the particle) can be interposed tends to be formed in a clearance between the spherical particles. As a result, the packing density of the magnetic powder tends to be enhanced. By enhancing the packing density, the composite material having the high saturation magnetic flux density as described above can easily be obtained. When the particle constituting the magnetic powder has the spherical shape, moreover, there is a tendency that the loss of the composite material is small. With the increase in the number of portions where the magnetic particles dispersed into the composite material come in contact with each other, the relative magnetic permeability of the composite material is excessively increased or an eddy current flows into a portion between the magnetic particles if the particles are formed of a metal. For this reason, there is a fear that the loss might be increased. Even if the spherical particles are adjacent to each other, however, the spherical particles simply come in point contact with each other substantially and rarely come in face contact with each other. Accordingly, it is supposed that the loss can be reduced. In the manufacture of the composite material, therefore, it is proposed to utilize, for the raw material, a particle constituting the magnetic powder which has a degree of circularity of 1.0 or more and 2.0 or less.

The degree of circularity is set to be a maximum diameter/circle equivalent diameter. The circle equivalent diameter specifies a contour of the particle constituting the magnetic powder and is a diameter of a circle having the same area as an area S surrounded by the contour. In other words, the circle equivalent diameter is represented by a circle equivalent diameter=$2\times\{$an area $S/\pi$ in the contour$\}^{1/2}$. The maximum diameter is set to be a maximum length of the particle having the contour. For example, the area S is obtained by fabricating a sample in which the magnetic powder to be used for the raw material is hardened with a resin or the like and observing a section of the sample using an optical microscope, a scanning type electron microscope: SEM or the like. It is sufficient to cause the observed image of the section thus obtained to be subjected to image processing (for example, binarization processing) or the like, thereby extracting the contour of the particle to calculate the area S in the contour. Referring to the maximum diameter, a maximum diameter of the particle is extracted from the contour of the particle which is extracted. In the case where the SEM is utilized, a measuring condition includes the number of sections: 50 or more (one visual field per section), a magnification: 50 to 1000, the number of particles to be measured per visual field: 10 or more, and the total number of particles: 1000 or more.

A particle having the degree of circularity of 1 which is measured as described above corresponds to a perfect sphere. As the degree of circularity of the magnetic powder used in the raw material approximates to 1, it is possible to obtain an enhancement in packing density and an achievement of excellent flowability. As the degree of circularity of the magnetic powder in the composite material approximates to 1, it is possible to reduce the loss and suppress an excessive increase in the relative magnetic permeability. Accordingly, it is preferable that the degree of circularity should be 1.0 or more and 1.5 or less, and particularly, should be 1.0 or more and 1.3 or less.

As described above, in order to increase the relative magnetic permeability through the excessive contact of the particles and to reduce the generation and increase of the eddy current, particularly if the particle is formed of a metal, it is desirable that the magnetic powder should be the coating powder. In the case where the powder having the particle shape approximating the perfect sphere having a degree of circularity satisfying a specific range is used for the raw material, even the magnetic particle having no insulating coating can suppress the excessive contact of the particles, thereby reducing the relative magnetic permeability of the composite material. Accordingly, the use, for the raw material, of the magnetic powder having the degree of circularity satisfying the specific range is taken as one of effective structures for manufacturing a composite material in a saturation magnetic flux density having a great value of 0.6 T or more, and furthermore, 1.0 T or more, and at the same time, a relative magnetic permeability having a comparatively small value of 35 or less.

In order to manufacture powder having the degree of circularity satisfying the specific range, for example, powder is fabricated by a gas atomizing method using an inert gas for a cooling medium or powder having different shapes formed by a water atomizing method or the like (powder having a degree of circularity out of the specific range) is subjected to round processing such as grinding. In the case where the grinding is carried out, it is possible to regulate a degree of circularity of magnetic powder to be used in a raw material by properly selecting a particle size of an abrasive grain. However, a method of obtaining powder having a predetermined degree of circularity is not restricted to these methods but it is sufficient to manufacture powder by the method of obtaining the degree of circularity. Also in some cases in which the magnetic powder to be used for the raw material contains coarse powder, moreover, the loss of the composite material is reduced with powder having a shape approximating a spherical shape, that is, powder having a degree of circularity which approximates to 1.0. The composite material is formed at a comparatively low pressure so that a degree of circularity of each particle constituting the magnetic powder in the composite material is substantially equal to a degree of circularity of each particle constituting the magnetic powder used for the raw material (the degree of circularity satisfies 1.0 or more and 2.0 or less). In order to measure the degree of circularity of the magnetic powder in the composite material, for example, the section of the composite material is taken and an image observed by microscope observation for the section is used as described above.

In the case where magnetic powder having a specific particle size distribution which will be described later is used for the raw material, a packing density can be enhanced effectively even if the particles has a nonspherical shape. Consequently, it is possible to obtain a composite material having a high proportion of a magnetic component. In other words, in the case where the particle size distribution of the magnetic powder to be used for the raw material is regulated, powder having an optional particle shape can be utilized for the raw material in the manufacture of the composite material. Therefore, the particle shape of the magnetic powder which can be used for the raw material has a high degree of freedom.

A size of the magnetic particle in the composite material can be selected properly. For example, the particle size of the magnetic particle is 10 μm or more and 200 μm or less. Moreover, the magnetic particle in the composite material can contain various particles having different sizes from each other. For example, when the particle size distribution of the magnetic particle in the composite material is taken, it can take a configuration in which a plurality of peaks is present. In brief, a certain particle having a small particle size and a certain particle having a large particle size are present at a high frequency to some degree. According to this configuration, fine particles can be interposed in a clearance formed between coarse particles. For this reason, the composite material has a high saturation magnetic flux density because the packing density of the magnetic powder can easily be enhanced and the proportion of the magnetic component tends to be raised. In addition, as the particle size of the magnetic powder is smaller, the eddy current loss can be reduced. Therefore, the composite material containing fine particles has a low loss.

The number of the peaks may be two or three or more. When magnetic powder having a particle size distribution with only one peak (for example, powder with a broad peak, powder with a steep peak or the like) is used for the raw material, the raw material is hard to handle and workability is reduced if the magnetic powder is fine, and the packing density is reduced if the magnetic powder is coarse. On the other hand, if two peaks are present depending on the particle size, the reduction in the workability can be suppressed, and furthermore, the packing density can be enhanced fully. In other words, when a particle size having a first peak and a particle size having a second peak in the particle size distribution are represented by $r_1$ and $r_2$ respectively, it is sufficient that two peaks satisfying $r_1 < r_2$ are present. In the case of a configuration in which two peaks satisfying $r_1 \leq (½) \times r_2$ are present, particularly, a fine particle having the particle diameter $r_1$ to be a half of the coarse particle having the particle diameter $r_2$ or less can be fully interposed in the clearance between the coarse particles so that the packing density can be enhanced. Accordingly, the saturation magnetic flux density is enhanced, and furthermore, the fine particle is present at a high frequency. Consequently, it is possible to obtain a composite material having a low loss. As a difference between the particle sizes $r_1$ and $r_2$: $r_2 - r_1$ is increased, the clearance is efficiently filled with the fine particle so that the packing density tends to be enhanced. Accordingly, it is preferable that the particle diameter $r_1$ should satisfy $r_1 \leq (⅓) \times r_2$. If the particle diameter $r_1$ is excessively small, however, handling is hard to perform so that workability tends to be reduced. For this reason, it is preferable that $r_1 \geq (1/10) \times r_2$ should be satisfied. Regardless of the material, as the particle diameter $r_1$ is smaller, a loss (particularly, an eddy current loss or an iron loss), cab be reduced and as the particle diameter $r_1$ is larger, the magnetic powder is easier to handle.

It is possible to employ a configuration in which the magnetic powder having the plurality of peaks is constituted of a material of the same type (the same composition), that is, a configuration in which the magnetic powder is constituted of a single material or a configuration in which the magnetic powder is constituted of a plurality of materials of different types. In the case of the former single material, for example, when the magnetic powder is pure iron powder, the particle diameter $r_1$ is 50 µm or more and 100 µm or less and the particle diameter $r_2$ is 100 µm or more and 200 µm or less, and preferably, the particle diameter $r_1$ is 50 µm or more and 70 µm or less and the particle diameter $r_2$ is 100 µm or more and 150 µm or less (where, $r_1 < r_2$, preferably $r_1 \le (\frac{1}{2}) \times r_2$). The composite material contains, at a high frequency, a sufficiently large particle having the particle diameter $r_2$ satisfying the range with respect to a fine particle having the particle diameter $r_1$ satisfying the range. Consequently, the difference between the particle diameter $r_1$ and the particle diameter $r_2$ is great so that the packing density can easily be enhanced. For this reason, the proportion of the magnetic component in the composite material becomes greater so that the saturation magnetic flux density is enhanced. Since the magnetic powder is the pure iron powder, the composite material has the higher saturation magnetic flux density. Moreover, the composite material contains, at a high frequency, the sufficiently fine particle (the particle having the particle diameter $r_1$) which is 50 µm or more and 100 µm or less with respect to the particle diameter $r_2$. Consequently, the eddy current loss can be reduced. Since the particle diameter $r_2$ is 200 µm or less, the eddy current loss can easily be reduced so that the composite material has a low loss. Furthermore, a particle size of the finest particle present at a high frequency is 50 µm or more. Therefore, the number of very fine particles having particle sizes of less than 50 µm is small so that the iron powder to be used for the raw material can easily be handled and workability is excellent.

In the case of the former single material, for example, when the magnetic powder is iron alloy powder, it is possible to employ a configuration in which handling can easily be carried out in the particle size of 50 µm or less and the particle diameter $r_1$ satisfies 50 µm or less. For example, it is possible to employ a configuration in which the particle diameter $r_1$ is 10 µm or more and 40 µm or less. It is possible to employ the particle diameter $r_2$ which is 40 µm or more and 150 µm or less (where, $r_1 < r_2$). According to this configuration, the particle diameter $r_1$ is smaller and the magnetic powder is constituted of an iron alloy. Therefore, it is possible to produce advantages of (1) the eddy current loss is further reduced so that a composite material having a low loss can be obtained, and (2) since the packing density can easily be further enhanced, the saturation magnetic flux density is also high to some degree although the magnetic powder is constituted of the iron alloy. Moreover, a comparatively fine iron alloy having a particle diameter of 50 µm or less can form a spherical particle more easily and is also excellent in productivity of fine and spherical powder.

In the case of the latter materials of different types, for example, it is possible to employ a configuration in which a plurality of peaks is present when the particle size distribution of the magnetic powder is taken, and at least two of the peaks are peaks of the powder constituted of materials having different relative magnetic permeabilities from each other. Referring to this configuration, both the fine magnetic powder and the coarse magnetic powder are contained at a high frequency and the materials of the individual pieces of powder are different from each other. Referring to this configuration, the magnetic powder constituted of the different materials is contained. Based on the composition, consequently, it is possible to enhance the saturation magnetic flux density or to reduce the eddy current loss. Referring to this configuration, furthermore, the fine and coarse mixed powder is contained. Therefore, a high packing density can be obtained. Accordingly, the saturation magnetic flux density is high. As a more specific configuration, for example, it is possible to employ a configuration in which one of peaks is a peak of pure iron powder and the other peak is a peak of iron alloy powder, a configuration in which the respective peaks are peaks of the iron alloy powder having different compositions from each other.

In the configuration including the pure iron powder and the iron alloy powder, in the case where powder having any of the peaks which has the smallest particle size is the pure iron powder, that is, the case where the pure iron powder has the particle diameter $r_1$ and the iron alloy powder has the particle diameter $r_2$, the fine pure iron powder is included at a high frequency. Even if the pure iron powder is contained, therefore, the eddy current loss can be reduced. Referring to this configuration, therefore, a high saturation magnetic flux density can be obtained by the pure iron powder at a high frequency, and the fine pure iron powder and the iron alloy powder are mixed so that a low loss can be acquired. Referring to this configuration, moreover, a fine pure iron particle having a high saturation magnetic flux density tends to be continuously present around the coarse iron alloy particle. For this reason, a magnetic flux can easily pass uniformly. As a specific particle size according to this configuration, the particle diameter $r_1$ is 50 µm or more and 100 µm or less, and furthermore, is 50 µm or more and 70 µm or less. The particle diameter $r_2$ is 50 µm or more and 200 µm or less (where, $r_1 < r_2$), and furthermore, is 150 µm or less.

In the configuration including the pure iron powder and the iron alloy powder, in the case where the powder having any of the peaks which has the smallest particle size is the iron alloy powder, that is, the case where the iron alloy powder has the particle diameter $r_1$ and the pure iron powder has the particle diameter $r_2$, the fine iron alloy powder is included at a high frequency. Consequently, the eddy current loss can be reduced more greatly. Referring to this configuration, therefore, a high saturation magnetic flux density can be obtained by containing the pure iron powder, and the low loss can further be obtained by containing the fine iron alloy powder. As a specific particle size according to this configuration, the particle diameter $r_1$ is 50 µm or less, and furthermore, is 10 µm or more and 30 µm or less. The particle diameter $r_2$ is 100 µm or more and 200 µm or less, and furthermore, is 140 µm or more and 200 µm or less (preferably, $r_1 \le (\frac{1}{2}) \times r_2$).

Referring to a configuration including only the iron alloy powder, it is possible to employ a configuration having a higher saturation magnetic flux density or a configuration having a lower loss depending on the characteristic of the powder having any of the peaks which has the smallest particle diameter, for example. As a specific particle size according to this configuration, the particle diameter $r_1$ is 50 µm or less, and furthermore, is 10 µm or more and 30 µm or less. The particle diameter $r_2$ is 30 µm or more and 200 µm or less (where, $r_1 < r_2$), and furthermore, is 40 µm or more and 150 µm or less.

In order to measure the particle size distribution of the magnetic powder in the composite material, for example, a polymer component is removed to extract the magnetic powder, and the magnetic powder thus obtained is analyzed by using a particle size analyzer. This technique can measure the particle size distribution of the magnetic powder with high precision because the polymer component is not present. In the case where the magnetic powder constituted of a plurality of different materials is contained, the particle size distribution may be measured every composition of the magnetic powder and these particle size distributions may be then synthesized. In the case where the composite material contains nonmagnetic powder which will be descried later, it is preferable to select the magnetic powder and the nonmagnetic powder by means of a magnet, for example. Alternatively, X-ray diffraction, energy dispersion X-ray spectroscopy: EDX or the like may be utilized to carry out component analysis, thereby performing the selection. A commercially available particle size analyzer can be utilized.

In order to manufacture the composite material having the particle size distribution described above, there is utilized magnetic powder containing, at high frequencies, particles having particle diameters $r_{10}$ and $r_{20}$ satisfying $r_{10}<r_{20}$ (preferably, $r_{10} \leq (\frac{1}{2}) \times r_{20}$) in the raw material respectively. In the case where commercially available powder is used, it is sufficient to check the particle size distribution, thereby utilizing powder satisfying the specific particle size distribution. In order to satisfy a desirable particle diameter, classification may be carried out by using a sieve or the like. The magnetic powder to be used for the raw material can be manufactured typically by using an atomizing method (a gas atomizing method, a water atomizing method or the like). By utilizing the powder manufactured through the gas atomizing method, particularly, there is a tendency that a composite material having a small loss is obtained. It is also possible to obtain a desirable particle diameter by properly grinding coarse powder. By preparing plural powder having different particle diameters as described above and utilizing the powder satisfying the degree of circularity for the raw material, moreover, it is possible to easily obtain a composite material having a lower loss and a higher saturation magnetic flux density.

By using, for the raw material, magnetic powder having a small difference in the particle diameter, the particle size distribution of the magnetic powder in the composite material may have only one peak. In the case where magnetic powder having the same particle size distribution and a different composition is used for the raw material, moreover, the particle size distribution of the magnetic powder in the composite material has only one broad peak or steep peak.

There is included magnetic powder in the composite material satisfying a density ratio=an apparent density/a true density which is 0.38 or more and 0.65 or less. This composite material can be manufactured by using, for the raw material, the magnetic powder having a density ratio which is 0.38 or more and 0.65 or less. The density ratio of the magnetic powder in the composite material thus obtained substantially maintains the density ratio of the magnetic powder used in the raw material. By using, for the raw material, the magnetic powder having the density ratio of 0.38 or more, it is possible to manufacture a composite material having a saturation magnetic flux density of 0.6 T or more without excessively raising a pressure in molding. The magnetic powder having the density ratio of 0.65 or less can easily be manufactured, and furthermore, can be prevented from becoming deposited in a mixture, thereby performing separation when it is mixed with the polymeric material. Consequently, it is possible to manufacture a composite material having the magnetic powder disposed uniformly therein. If the density ratio of the magnetic powder in the composite material is 0.65 or less, moreover, the relative magnetic permeability can be suppressed at a low value. Accordingly, it is possible to produce excellent advantages that the composite material having the density ratio satisfying the specific range (1) is excellent in the productivity of the raw material and the composite material, (2) is homogeneous, and (3) can reduce relative magnetic permeability.

The density ratio is 0.45 or more and is further preferably 0.5 or more, and is preferably 0.6 or less. In order to set the density ratio to be 0.38 or more and be 0.65 or less, for example, powder (spherical powder) having the degree of circularity satisfying the specific range is used for the raw material. Accordingly, it is possible to suitably utilize, for the raw material, the powder manufactured by the gas atomizing method or the like as described above. By removing the coarse particles whose contact areas are increased readily through the classification of the magnetic powder to be used for the raw material or the like, it is possible to easily increase the apparent density.

In the case where the magnetic powder is the iron powder, it is preferable that the apparent density of the iron powder should be 3.0 g/cm$^3$ or more and 5.0 g/cm$^3$ or less. In the case where the apparent density of the iron powder satisfies the range, the density ratio can be 0.38 or more and 0.65 or less. Accordingly, this configuration can produce advantages that (4) the saturation magnetic flux density is enhanced by containing the pure iron powder in addition to the advantages of (1) high productivity, (2) homogeneous and (3) a lower relative magnetic permeability as described above. The apparent density of the iron powder can be changed by regulation of the particle diameter or shape of the iron powder. There is a tendency that the apparent density is increased as the particle size of the iron powder is smaller or the shape of the iron powder approximates to the spherical shape.

When the magnetic powder to be used for the raw material is subjected to proper surface processing in advance, it is possible to expect an advantage that condensation can be prevented and sedimentation into a polymeric material (particularly, a resin) can be suppressed. For example, when the surface processing is previously carried out by a silane coupling agent or the like, adhesion between the magnetic powder and the polymeric material can be improved so that it is possible to suppress the sedimentation of the magnetic powder in the polymeric material which is not hardened. For example, when the surface processing is previously carried out by a surface active agent or the like, the condensation can be prevented. These surface processing may be carried out sequentially or simultaneously. In mixture of the magnetic powder and the polymeric material, it is also possible to mix a surface processing agent for preventing the sedimentation. However, there is a tendency that a high sedimentation preventing advantage can be obtained by execution of the surface processing before mixture.

The content of the magnetic powder in the composite material (a total amount regardless of a material) is set to be more than 50% by volume and 75% by volume or less with respect to the whole composite material. The content of the magnetic powder is more than 50% by volume so that the proportion of the magnetic component is sufficiently high. Consequently, it is possible to obtain a composite material in which the saturation magnetic flux density is high and the relative magnetic permeability is not excessively high but is more than 20 and 35 or less. Since the content of the magnetic powder is 75% by volume or less, the mixture of the magnetic powder and the unhardened polymeric material which are raw materials is excellent in fluidity in the manufacture of the composite material. Therefore, a molding die can be filled with the mixture well. Accordingly, even a composite material having a complicated shape can be molded with high precision so that the productivity of the composite material is high. Moreover, the composite material is excellent in shape precision and dimensional accuracy. In particular, it is desirable that the content of the magnetic powder should be 55% by volume or more and be 70% by volume or less. The raw material is prepared to have a desirable content. The content of the magnetic powder in the composite material is obtained by removing the polymer component to acquire a volume of the magnetic component or performing image processing over the photomicrograph of the section to convert a volume rate from an area rate of the magnetic component in the section.

In the case where the content of the magnetic powder is enhanced within the range, for example, the case where the content is set to be 60% by volume or more, and furthermore, be 65% by volume or more, it is possible to easily achieve a high packing density by using the mixed powder of the fine powder and the coarse powder as described above. The composite material thus obtained has a high proportion of the magnetic component and a high saturation magnetic flux density.

Polymeric Material

A polymeric material to be a binder in a composite material includes a resin and rubber. Examples of the resin include a thermosetting resin such as a silicone resin, an epoxy resin, a phenol resin, an unsaturated polyester resin or a urethane resin, a thermoplastic resin such as a polyphenylene sulfide (PPS) resin, a polyamide resin, a polyimide resin or a fluororesin, and the like. It is also possible to utilize BMC (Bulk Molding Compound) containing the unsaturated polyester resin as a principal component and a reinforcing material such as a glass fiber. Examples of the rubber include silicone rubber, fluororubber and the like. The silicone resin, the epoxy resin, the PPS resin, the silicone rubber and the like in the listed materials are excellent in a heat resistance. In the case where the thermosetting resin or the rubber is used, a mixture filled in the molding die is heated to a predetermined temperature and is thus hardened. Examples of other polymeric materials include a normal temperature curable resin or a low temperature curable resin. In this case, the mixture filled in the molding die is left at a normal temperature to a comparatively low temperature to cure the resin.

The composite material generally has more polymeric materials such as a resin or rubber which is a nonmagnetic material as compared with the powder compound. Also in the case where the same magnetic powder as the powder compact constituting the inner core 31 is contained, accordingly, the outer core 32 constituted of the composite material tends to have a lower saturation magnetic flux density and a lower relative magnetic permeability than those of the powder compact. By regulating the material or shape of the magnetic powder, the presence or thickness of the insulating coating, the content of the binder or the like, it is possible to easily change the magnetic characteristic of the composite material.

The composite material can be typically formed by injection molding or cast molding. The injection molding mixes the polymeric material and the magnetic powder to be the raw material in a fluidization state (a liquid state generally having a viscosity), applies a predetermined pressure to the mixture (a slurry-like mixture) and pours the mixture into a molding die having a predetermined shape to perform molding, and then hardens the polymeric material. The cast molding obtains the same mixture as that in the injection molding and then pours the mixture into the molding die without applying a pressure to perform molding and hardening. In the first embodiment, the case 4 can be utilized for the molding die. In this case, a composite material (in this case, the outer core 32) conforming to an inner peripheral shape of the case 4 can easily be molded with high precision. It is also possible to fabricate a plurality of compacts having a desirable shape and combine the compact constituted of these composite materials, thereby building the magnetic core 3 having a desirable shape.

Magnetic Characteristic

The saturation magnetic flux density of the composite material is set to be 0.6 T or more. As the saturation magnetic flux density of the composite material is increased, a magnetic core having a high saturation magnetic flux density can be built, and thus 0.8 T or more, and furthermore, 1 T or more and 1.1 T or more are preferable and an upper limit is not particularly provided. In this example, however, the saturation magnetic flux density is set to be less than the saturation magnetic flux density of the inner core 31 (the powder compact). In the case where only the pure iron is used for the magnetic powder, particularly, a saturation magnetic flux density of 1.15 T or more can easily be implemented. In the case where only the iron alloy is used for the magnetic powder, a saturation magnetic flux density of more than 1.05 T can easily be implemented.

The relative magnetic permeability of the composite material is set to be more than 20 and 35 or less. Since the relative magnetic permeability of the composite material is more than 20, a loss can be reduced also when the composite material is used for the magnetic core 3 (in this case, particularly, the outer core 32 disposed on the outside of the coil 2). Since the relative magnetic permeability of the composite material is 35 or less, the magnetic core 3 is magnetically saturated with difficulty when the composite material is used for the magnetic core 3, and a gap member or an air gap can be reduced. As the relative magnetic permeability of the composite material is reduced, the gap member or the like can easily be reduced to enable contribution to the reduction in the number of the components in the reactor 1. Accordingly, it is preferable that the relative magnetic permeability of the composite material should be more than 20 and be 30 or less.

Herein, the composite material constituting the outer core 32 is formed of a composite material including coating powder having an insulating coating on a surface of a magnetic particle and an epoxy resin, and satisfies a saturation magnetic flux density which is 0.6 T or more and a relative magnetic permeability which is more than 20 and 35 or less. A content of the coating powder is more than 50% by volume and 75% by volume or less. Accordingly, the magnetic core 3 has the magnetic characteristic which is partially different. The inner core 31 has a higher saturation magnetic flux density than the outer core 32, and the outer core 32 has a lower relative magnetic permeability than the inner core 31. The relative magnetic permeability of the outer core 32 is lower than that of the inner core 31 which is 100 or more and 500 or less. Consequently, a magnetic flux easily passes through the inner core 31.

The magnetic core 3 according to this example, has a whole relative magnetic permeability which is more than 20 and 100 or less. The magnetic core 3 has a whole relative magnetic permeability which is comparatively low as described above, and can wholly have an integrated gapless structure without using a gap member or an air gap.

[Coil 2]

Figure 3:
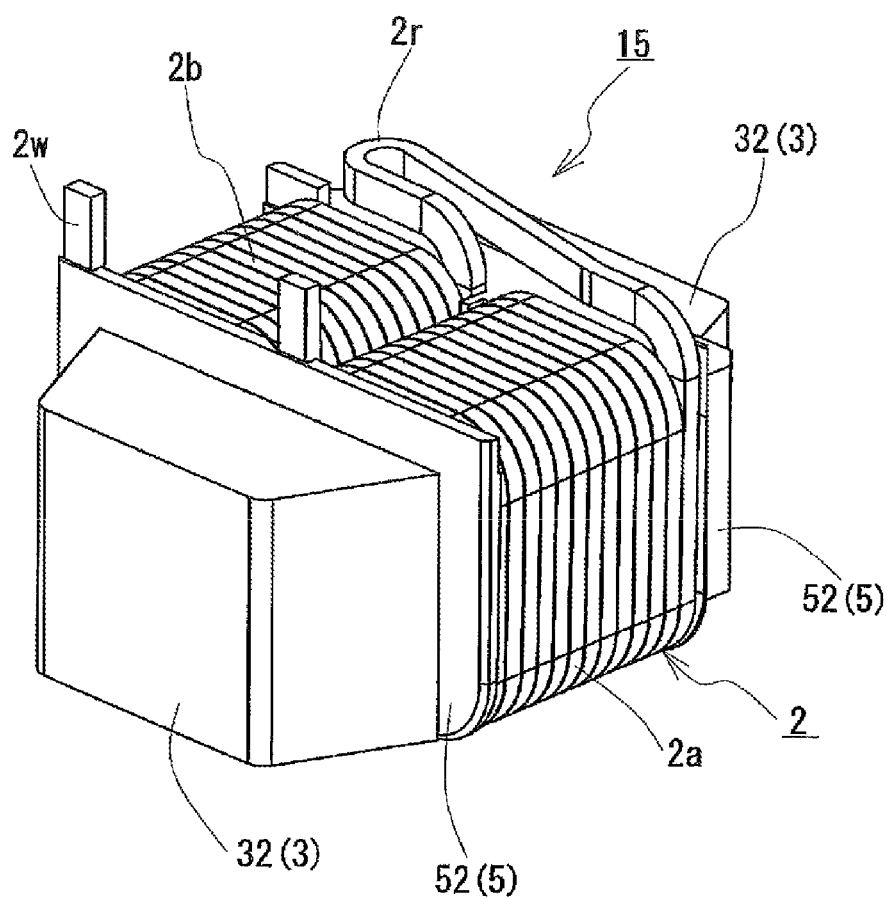
FIG. 3(A) is a brief perspective view showing a reactor according to a third embodiment and FIG. 3(B) is a brief perspective view showing a magnetic core provided in the reactor.
Figure 3:
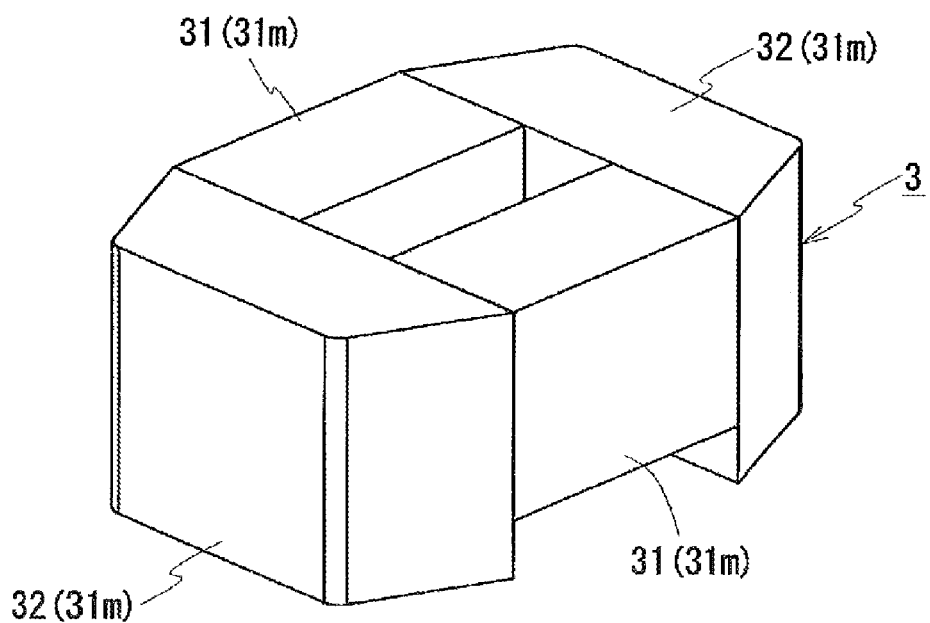

The coil 2 is a tube-shaped member obtained by spirally winding a single continuous wire 2w. The wire 2w is preferably a coated wire having an insulating coating made of an insulating material on the outer periphery of a conductor made of a conductive material such as copper, aluminum or an alloy thereof. It is possible to utilize conductors having various shapes, for example, a rectangular wire with a rectangular cross section, a circular wire with a circular cross section, a deformed line with a polygonal cross section and the like. An insulating material constituting an insulating coating is represented by an enamel material such as polyamideimide. As the insulating coating is thicker, an insulation performance is enhanced. A specific thickness of the insulating coating is 20 or more and 100 µm or less. The sectional area and the winding number (the number of turns) of the wire $2w$ can properly be selected to have a desirable characteristic. The shape of the end surface of the coil 2 may be a shape whose an outer shape is formed solely with a curved line, for example, an annular shape shown in FIG. 2, an elliptic shape (not shown) and the like, and a flat shape whose an outer shape is formed with a curved line and a straight line, for example, a race track shape, a corner rounded rectangular shape (see FIG. 3 which will be described later) and the like. A cylindrical coil having an annular end surface is easy to wind a wire and is excellent in productivity.

Herein, the coil 2 is an edgewise coil made of an edgewise-wound coated rectangular wire, which includes a conductor being a copper rectangular wire with a rectangular cross-sectional shape and an insulating coat being enamel. The end face shape of the coil 2 has an annular shape.

An external device (not shown) such as a power supply for supplying electric power to the coil 2 is connected to both ends of the wire $2w$ forming the coil 2. Typically, the both ends of the wire $2w$ are properly extended from a turn (are led out of the case 4 in FIGS. 1(A) and 1(B)) and a terminal member is connected to a conductor portion exposed by peeling the insulating coating, and the external device is connected through the terminal member to the both ends of the wire $2w$. The terminal member is constituted of a conductive material such as copper or aluminum. Welding (for example, TIG welding), contact bonding or the like is utilized for the connection of the terminal member.

The reactor 1 shown in this example employs a configuration (hereinafter referred to as a vertical type) in which the assembly of the coil 2 and the magnetic core 3 is accommodated such that the axial direction of the coil 2 is orthogonal to the bottom surface of the case 4. Referring to the vertical type, it is possible to reduce an installation area of the reactor 1 for an installation target such as a cooling table where the reactor 1 is to be installed.

[Case]

The case 4 according to this example is a rectangular parallelepiped shaped container configured with a rectangular bottom surface and four side walls erected from the bottom surface, and has a bottomed tube shape where a surface opposing to the bottom surface is opened. The case 4 accommodates the assembly of the coil 2 and the magnetic core 3 to protect and mechanically protect the coil 2 and the magnetic core 3 from an environment, and furthermore, is utilized for a heat-release path when the reactor 1 is fixed to the installation target such as the cooling table. Accordingly, a material constituting the case 4 is a material having a high thermal conductivity, and preferably, a material having a higher thermal conductivity than that of the magnetic powder such as iron. For example, it is possible to suitably utilize, as the constituting material, a metal such as aluminum, an aluminum alloy, magnesium or a magnesium alloy. Since the aluminum, the magnesium, and the alloy are lightweight, they are also suitable for a material constituting automobile components, which are desired to be lightweight. Moreover, the aluminum, the magnesium and the alloy are nonmagnetic materials and conductive materials. For this reason, a leakage flux to the outside of the case 4 can also be prevented effectively. Herein, the case 4 is formed of the aluminum alloy.

In addition, the case 4 according to this example has a mount portion 41 formed integrally. The mount portion 41 serves to fix the reactor 1 to the installation target. The mount portion 41 has a bolt hole and can easily fix the reactor 1 to the installation target by means of a bolt (not shown). If the case 4 includes a positioning portion for placing the coil 2 or the inner core 31 into a predetermined position, moreover, it is possible to dispose the coil 2 or the inner core 31 in a proper position of the case 4. The case 4 has the positioning portion (not shown) such that the coil 2 is disposed in a central part of the case 4 as shown in FIG. 1(B). If a cover constituted of a conductive material such as aluminum is provided in the same manner as in the case 4, furthermore, it is possible to prevent a leakage flux and to protect or mechanically protect the outer core 32 from an environment. It is preferable that the cover should be provided with a notch or a through hole in order to pull out the end of the wire $2w$ constituting the coil 2 or a size of the cover should be regulated to form a clearance. Alternatively, it is also possible to form a cover made of a resin by separately filling the resin in the vicinity of the opening portion of the case 4.

[Other Structure]

In order to enhance insulation performance between the coil 2 and the magnetic core 3, it is possible to employ a configuration in which the outer periphery of the coil 2 is covered with an insulating resin or a configuration in which the outer periphery of the coil 2 is covered with an insulating material such as an insulating paper, an insulating sheet or an insulating tape. Examples of the insulating resin include an epoxy resin, a urethane resin, a polyphenylene sulfide (PPS) resin, a polybutylene terephthalate (PBT) resin, an acrylonitrile butadiene styrene (ABS) resin, unsaturated polyester and the like. In order to enhance insulation performance between the coil 2 and the inner core 31, moreover, it is possible to employ a configuration in which an insulating bobbin is provided on the outer periphery of the inner core 31. The bobbin may include a tube-shaped member disposed on the outer periphery of the inner core 31 and an annular-shaped flange portion provided on both ends of the tube-shaped member. If the bobbin employs a configuration in which a plurality of divided pieces is combined to be one unit, it can easily be disposed in the inner core 31. Example of a material constituting the bobbin include a PPS resin, a liquid crystal polymer (LCP), a polytetrafluoroethylene (PTFE) resin and the like. In addition, the outer periphery of the inner core 31 can be covered with an insulating tube such as a heat-shrinkable tube. In the case where the coil 2 comes in contact with the case 4, furthermore, an insulating material can be interposed between the coil 2 and the case 4 in order to enhance insulation performance therebetween. When a contact portion with the magnetic core 3 in a leading place of the wire $2w$ is also covered with the insulating resin, the insulating material, the heat-shrinkable tube or the like, the insulation performance can be enhanced.

Alternatively, the case 4 can be omitted. By omitting the case, it is possible to reduce the size and weight of the reactor. In the case where the outer peripheral surface of the assembly including the coil 2 and the magnetic core 3 is constituted of a composite material as in this example, a polymer component such as a resin is contained. Also in a configuration in which the magnetic core 3 is exposed, therefore, it is possible to protect and mechanically protect the coil 2 from an external environment. In a configuration in which the outer periphery of the assembly including the coil 2 and the magnetic core 3 is further covered with the insulating resin, it is possible to protect (to enhance a corrosion resistance or the like) and mechanically protect both the coil 2 and the magnetic core 3 from the external environment. If the insulating resin contains, for example, a filler made of ceramics having a high thermal conductivity or the like, heat-release performance is high, which is preferable. Moreover, the mount portion may be molded integrally with the portion covered with the resin.

[Purpose of Use]

The reactor 1 having the above-described structure can be preferably utilized for a purpose of use under electricity application conditions in which a maximum current (direct current) is in a range from approximately 100 to 1000 A, an average voltage is in a range from approximately 100 to 1000 V, and a usable frequency is in a range from approximately 5 to 100 kHz, or typically, a component of an on-vehicle power conversion device in a vehicle such as an electric vehicle, a hybrid electric vehicle, etc

[Method of Manufacturing Reactor]

The reactor 1 can be manufactured in the following manner, for example. First of all, the coil 2 and the inner core 31 formed of a powder compact are prepared and the inner core 31 is inserted into the coil 2 to fabricate the assembly of the coil 2 and the inner core 31 as shown in FIG. 2. Then, the assembly is accommodated in the case 4.

A mixture of the magnetic powder and the polymeric material (unhardened) constituting the outer core 32 (FIGS. 1(A) and 1(B)) is prepared. They are sufficiently mixed such that the magnetic powder is uniformly dispersed, and thereafter, the mixture thus obtained is poured into the molding die (herein, the case 4). Since this mixture is excellent in the fluidity as described above, it can be filled with high precision into the case 4 serving as a complicated molding space by the presence of the coil 2 and the inner core 31. After the filling, the polymeric material of the mixture is hardened so that the outer core 32 constituted of the composite material can be formed. Herein, the outer core 32 is formed to come in contact with one end surface of the inner core 31 and an outer peripheral surface on the other end surface side of the inner core 31 as shown in FIG. 1(B). Consequently, it is possible to provide the magnetic core 3 forming a closed magnetic circuit when the coil 2 is energized. In this example, accordingly, the reactor 1 is obtained simultaneously with the formation of the outer core 32.

[Advantage]

The composite material constituting at least a part of the magnetic core 3 (herein, the outer core 32) satisfies a specific relative magnetic permeability so that a loss can be reduced. Therefore, the reactor 1 has a low loss. Moreover, the composite material constituting at least a part of the magnetic core 3 (herein, the outer core 32) satisfies the specific magnetic permeability. Consequently, the gap member or the air gap can be reduced (herein, they can be omitted). Accordingly, the reactor 1 has the small number of components, and an assembling step or a step of bonding the gap member can be reduced (herein, they can be omitted). Therefore, the productivity is also high.

Moreover, the reactor 1 has a high saturation magnetic flux density (0.6 T or more) because the proportion of the magnetic component of the composite material constituting the outer core 32 is high (the content of the magnetic powder is more than 50% by volume). In the reactor 1, particularly, the inner core 31 is made of the powder compact so that the inner core 31 also has a high saturation magnetic flux density. In the reactor 1, accordingly, the whole magnetic core 3 has a higher saturation magnetic flux density (a value obtained by averaging the saturation magnetic flux density of the magnetic core 3) as compared with the case where the whole magnetic core 3 is constituted of the composite material.

Furthermore, the reactor 1 constitutes the outer core 32 with the composite material. Consequently, it is possible to obtain advantages that (1) the magnetic characteristic can easily be changed, (2) the coil 2 and the inner core 31 are covered to enable their protection and mechanical protection from the external environment because the polymer component such as a resin is possessed, (3) the polymer component such as the resin can be utilized for a bonding material to the inner core 31, and (4) the reactor 1 can be formed simultaneously with the formation of the outer core 32 so that the productivity is high.

In addition, referring to the reactor 1, the saturation magnetic flux density of the inner core 31 is higher than that of the outer core 32. Consequently, in the case where there is obtained the same magnetic flux as that of a core constituted of a single material (a core having a uniform saturation magnetic flux density as a whole), the sectional area of the inner core 31 (particularly, a portion covered with the coil 2) can be reduced. By reducing the size of the inner core 31, it is also possible to reduce the size of the coil 2 (to shorten the wire 2w). Moreover, the reactor 1 has a gapless structure. For this reason, it is possible to reduce a copper loss caused by a magnetic flux leakage in a gap portion. Therefore, the coil 2 and the inner core 31 can be disposed close to each other. From the foregoing, the reactor 1 is small-sized. Moreover, it is possible to reduce the weight of the reactor 1 by decreasing the size of the coil 2 (shortening the coil 2).

Second Embodiment

In the first embodiment, there is proposed the configuration in which the composite material forming a part of the magnetic core is constituted of the magnetic powder and the polymeric material (the resin). In addition, in the case where at least a part of the magnetic core is constituted of the composite material, it is possible to employ a configuration in which the composite material contains the nonmagnetic powder constituted of a material of at least one type, that is, a configuration in which the magnetic core is constituted of the composite material containing the magnetic powder, the nonmagnetic powder, and the polymeric material. It is assumed that the "magnetic material" of the magnetic powder is a ferromagnetic material in a wide sense and is typically a soft magnetic material. It is assumed that the "nonmagnetic material" of the nonmagnetic powder is not the ferromagnetic material.

Nonmagnetic Powder

The nonmagnetic powder has an effect for suppressing the sedimentation of the magnetic powder in the manufacture of the composite material. In order to fully obtain the effect, it is preferable that the nonmagnetic powder should have a smaller specific gravity than the magnetic powder. More specifically, examples of the nonmagnetic powder include the metal such as Al, a non-metallic inorganic material such as ceramics or silicon (Si), for example, $SiO_2$, $Al_2O_3$, $Fe_2O_3$, BN, AlN, ZnO or $TiO_2$, an organic material such as a silicone resin, and the like. In particular, the $SiO_2$ (silica) can apply a thixotropic property to a resin, and can easily suppress the sedimentation of the magnetic powder in the case where the polymeric material is set to be the resin. If the nonmagnetic powder constituted of a material having a high thermal conductivity, for example, $SiO_2$, $Al_2O_3$, BN or AlN is contained, the heat-release performance of the composite material can be enhanced. By utilizing the composite material, therefore, it is possible to obtain a magnetic core or a reactor which is excellent in the heat-release performance. If powder containing a silicone resin is contained, it is possible to suppress generation of a crack on the composite material. By utilizing the composite material, accordingly, it is possible to obtain a magnetic core or a reactor which has a high strength. In the case where a silicone resin is used for the polymeric material to be a binder, a powder silicon resin is added to an uncured silicone resin. It is also possible to employ a configuration in which nonmagnetic powder constituted of a material of one type is contained and a configuration in which nonmagnetic powder constituted of different materials of plural types is contained. In addition, referring to the configuration in which the nonmagnetic powder is contained, a nonmagnetic particle is presented between magnetic particles so that the relative magnetic permeability of the composite material can also be reduced easily.

Examples of the shape of magnetic particles constituting the nonmagnetic powder include a spherical shape, a non-spherical shape (for example, a plate shape, a needle shape, a rod shape or the like) and the like. If the spherical shape is taken, particularly, there is an advantage that the nonmagnetic powder can easily be filled in a clearance formed between the magnetic particles and fluidity is high. Moreover, the nonmagnetic particle may be a solid element or a hollow body. In the case of the hollow body, it is possible to reduce the weight of the composite material. Commercially available powder can be utilized for the nonmagnetic powder. It is possible to employ a configuration in which nonmagnetic powder having a shape of one type is included or a configuration in which nonmagnetic powder having different shapes of plural types is included.

It is preferable that the magnetic powder and the nonmagnetic powder in the composite material should have different particle diameters. In particular, there is preferred a configuration in which a maximum particle diameter $r_n$ max having a peak in the nonmagnetic powder is smaller than a minimum particle diameter $r_m$ min having a peak in the magnetic powder when the particle size distribution of the mixed powder including the magnetic powder and the nonmagnetic powder is taken. Referring to this configuration, a magnetic particle having a larger particle diameter than a nonmagnetic particle is present at a high frequency. For this reason, a fine nonmagnetic particle can be present in a clearance formed between the magnetic particles, it is possible to prevent the packing density of the magnetic powder from being reduced with the inclusion of the nonmagnetic powder or the packing density can be prevented from being substantially reduced. In other words, this configuration can prevent a proportion of a magnetic component from being reduced due to the inclusion of the nonmagnetic powder.

As a difference between the particle diameters of the magnetic particle and the nonmagnetic particle is increased, the advantages can easily be obtained. Therefore, it is preferable that the maximum particle diameter $r_n$ max having the peak in the nonmagnetic powder should be ⅓ or less of the minimum particle diameter $r_m$ min having the peak in the magnetic powder ($r_n$ max≤(⅓)×$r_m$ min) and/or the maximum particle diameter having the peak in the nonmagnetic powder should be 20 μm or less ($r_n$ max≤20 μm). As the nonmagnetic powder is smaller, the clearance can be filled more efficiently, and preferably, the nonmagnetic powder can be interposed in only the clearance and can easily spread uniformly around the magnetic particles. Therefore, the sedimentation of the magnetic particle can be suppressed effectively. Accordingly, $r_n$ max≤(⅕)×$r_m$ min and $r_n$ max 10 μm is more preferable. For example, it is possible to utilize nonmagnetic powder having a particle diameter which is in a range from approximately 1 μm to 10 μm or fine nonmagnetic powder having a particle diameter of less than 1 μm. Even if the nonmagnetic powder is thus fine, it can easily be handled and is excellent in workability. Examples of a specific configuration include a composite material in which particle diameters $r_1$ and $r_2$ of first and second peaks of the magnetic powder and a particle diameter $r_n$ having a peak of the nonmagnetic powder in the particle size distribution of the mixed powder satisfy $r_2=2r_1$ and $r_n=(⅓)×r_1$. It is possible to employ any of a configuration containing nonmagnetic powder having a single particle diameter (that is, a configuration having a single peak of the nonmagnetic powder) and a configuration containing nonmagnetic powder having a plurality of different particle diameters (that is, a configuration in which a plurality of peaks of the nonmagnetic powder is present). In the latter case, both the magnetic powder and the nonmagnetic powder have a plurality of peaks.

If the content of the nonmagnetic powder is 0.2% by mass or more with respect to the whole composite material, the nonmagnetic particle fully spreads around the magnetic powder so that the sedimentation of the magnetic powder can be suppressed effectively. In the case where the nonmagnetic powder is constituted of a material having a high thermal conductivity, the nonmagnetic powder is sufficiently present if the nonmagnetic powder of 0.2% by mass or more is contained. Therefore, the heat-release performance of the composite material can be enhanced more greatly. In addition, the composite material can have uniform heat-release performance by the uniform presence of the nonmagnetic powder as described above. As the amount of the nonmagnetic powder is larger, the advantage can be obtained more greatly. Therefore, the content of the nonmagnetic powder (a total amount in the case where plural types of materials are included) is preferably 0.3% by mass or more, and is further preferably 0.5% by mass or more with respect to the whole composite material. If the nonmagnetic powder is excessively contained, however, the proportion of the magnetic component is reduced. For this reason, the content of the nonmagnetic powder is preferably 20% by mass or less, is further preferably 15% by mass or less, and is particularly preferably 10% by mass or less.

The composite material containing the nonmagnetic particle can effectively prevent the sedimentation of the magnetic powder in a mixture of raw materials in manufacture. Therefore, the mixture is excellent in fluidity and can be filled well in a molding die (the case 4 in the first embodiment). Accordingly, the composite material can be manufactured highly precisely even when it has a complicated shape. Moreover, the magnetic particle can easily be dispersed uniformly into the mixture and can be molded and hardened in the state where the magnetic powder is uniformly dispersed. Therefore, it is possible to obtain a composite material in which the magnetic powder and the nonmagnetic powder are uniformly dispersed. In other words, the portion where the magnetic powder is locally present to incur a high loss is hardly produced. As a result, it is possible to obtain the composite material in which the loss for the whole composite material can be reduced.

Further, since the composite material in its entirety exhibits the uniform magnetic characteristic and the uniform thermal characteristic, the composite material is highly reliable.

Test Example

A composite material containing magnetic powder and a polymeric material was prepared and a magnetic characteristic of the composite material thus obtained was examined.

Pure iron powder (Fe: 99.5% by mass or more), Fe—Si alloy powder (Si: 6.5% by mass, a residual part Fe and inevitable impurities) were prepared as magnetic powder of a raw material. The pure iron powder was set to be coating powder including insulating coating constituted of phosphate on an outer periphery of a pure iron particle, and the Fe—Si alloy powder was set to be bare powder having no insulating coating.

A particle size distribution of each prepared magnetic powder was exampled using a commercially available device (Microtrac particle size distribution analyzer MT3300, available from NIKKISO CO., LTD), which employs a laser diffraction and scattering method. The result (a mode: μm, a high frequency particle diameter: μm) is shown in Tables 1 and 2. A thickness of the insulating coating included in the coating powder is approximately 0.1 μm or less, which is very thin. Therefore, the particle diameter of the coating powder is not substantially influenced. For this reason, the particle diameter of the coating powder is treated as the particle diameter of the magnetic powder.

By using a microscope observation image for a section of the prepared magnetic powder, a degree of circularity (a maximum diameter/a circle equivalent diameter) was examined as described above (the number of measured particles: 1000 or more). The result is also shown in Tables 1 and 2.

There was obtained a density ratio=an apparent density/a true density of the prepared magnetic powder. The result is shown in Table 3. The apparent density was obtained based on JIS Z 2504 (2000) "Metallic powders—Determination of apparent density". The apparent density of the prepared pure iron powder had fine powder (a mode of 54 μm): 3.4 g/cm$^3$, coarse powder (a mode of 109 μm): 3.29 g/cm$^3$, and fine/coarse mixed powder: 3.62 g/cm$^3$. The apparent density of the Fe—Si alloy powder had fine powder (a mode of 11 μm): 2.82 g/cm$^3$, coarse powder (a mode of 141 μm): 3.25 g/cm$^3$, and fine/coarse mixed powder: 3.34 g/cm$^3$. The true density was obtained based on a composition and a specific gravity of a constituent element. The true density of the pure iron powder and the Fe—Si alloy powder simple substance is obtained by examining a literature value or the like. In the case where powder made of a plurality of different materials is contained, moreover, a density ratio was obtained for the mixed powder. For example, in the case where the pure powder and the Fe—Si alloy powder are contained, the density ratio was obtained by carrying out calculation in accordance with (true density of iron×pure iron powder content (% by volume)+true density of Fe—Si alloy×Fe—Si alloy powder content (% by volume)×100.

For all samples, an epoxy resin was prepared as a polymeric material of a raw material. A composite material containing a nonmagnetic powder was also prepared. A silica filler (a particle diameter was 5 nm or more and is 50 nm or less, a mode of 12 nm 20 μm) was prepared for the nonmagnetic powder. The nonmagnetic powder was prepared such that a content with respect to the whole composite material is 0.3% by mass 0.2% by mass). The presence of the inclusion of the nonmagnetic powder is also shown in Table 3.

Magnetic powder, a polymeric material and nonmagnetic powder (properly) were prepared such that the content of the magnetic powder with respect to the whole composite material is equal to the amounts (% by volume) shown in Tables 1 and 2 and it is possible to obtain a composite material having a size to enable sufficient preparation of a sample which will be described later. A residual part except for the magnetic powder was a polymeric material and nonmagnetic powder (properly).

Although Tables 1 to 3 are shown in three tables for convenience of the sizes of the respective tables, sample conditions of sample No. 1-1 to No. 1-10 are indicated in these three tables. For example, as the magnetic powder, the sample No. 1-1 includes only the pure iron powder, the sample No. 1-5 includes only the Fe—Si alloy powder, and the sample No. 1-9 includes both the pure iron powder and the Fe—Si alloy powder.

TABLE 1

| | Pure iron powder | | | | | | | |
|---|---|---|---|---|---|---|---|---|
| | Fine | | | | Coarse | | | |
| Sample No. | Mode (μm) | High frequency (μm) | Degree of circularity | Content (% by volume) | Mode (μm) | High frequency (μm) | Degree of circularity | Content (% by volume) |
| 1-1 | 54 | 48-57 | 1.5 | 12 | 109 | 90-128 | 1.5 | 50 |
| 1-2 | 54 | 48-57 | 1.5 | 56 | — | — | — | — |
| 1-3 | — | — | — | — | 109 | 90-128 | 1.5 | 56 |
| 1-4 | 54 | 48-57 | 1.5 | 12 | 109 | 90-128 | 1.5 | 48 |
| 1-5 | — | — | — | — | — | — | — | — |
| 1-6 | — | — | — | — | — | — | — | — |
| 1-7 | — | — | — | — | — | — | — | — |
| 1-8 | — | — | — | — | — | — | — | — |
| 1-9 | — | — | — | — | 109 | 90-128 | 1.5 | 56 |
| 1-10 | — | — | — | — | 109 | 90-128 | 1.5 | 52 |

TABLE 2

| | Fe—Si alloy powder | | | | | | | |
|---|---|---|---|---|---|---|---|---|
| | Fine | | | | Coarse | | | |
| Sample No. | Mode (μm) | High frequency (μm) | Degree of circularity | Content (% by volume) | Mode (μm) | High frequency (μm) | Degree of circularity | Content (% by volume) |
| 1-1 | — | — | — | — | — | — | — | — |
| 1-2 | — | — | — | — | — | — | — | — |
| 1-3 | — | — | — | — | — | — | — | — |
| 1-4 | — | — | — | — | — | — | — | — |
| 1-5 | 11 | 8-17 | 1.3 | 12 | 141 | 125-176 | 1.1 | 50 |
| 1-6 | 11 | 8-17 | 1.3 | 56 | — | — | — | — |
| 1-7 | — | — | — | — | 141 | 125-176 | 1.1 | 56 |
| 1-8 | 11 | 8-17 | 1.3 | 12 | 141 | 125-176 | 1.1 | 48 |
| 1-9 | 11 | 8-17 | 1.3 | 14 | — | — | — | — |
| 1-10 | 11 | 8-17 | 1.3 | 13 | — | — | — | — |

TABLE 3

| Sample No. | Nonmagnetic powder | Density ratio |
|---|---|---|
| 1-1 | No | 0.46 |
| 1-2 | No | 0.43 |
| 1-3 | No | 0.42 |
| 1-4 | Yes | 0.46 |
| 1-5 | No | 0.45 |
| 1-6 | No | 0.38 |
| 1-7 | No | 0.44 |
| 1-8 | Yes | 0.45 |
| 1-9 | No | 0.47 |
| 1-10 | Yes | 0.47 |

The magnetic powder, the polymeric material (a resin) and the nonmagnetic powder (properly) which were prepared were mixed to make a mixture, the mixture was filled in a molding die having a predetermined shape, and the resin was then cured to obtain a composite material. Herein, a disc-shaped sample having an outside diameter: φ34 mm, an inside diameter: φ20 mm and a thickness: 5 mm was made as a sample for measuring a magnetic characteristic, and a disk-shaped sample having a diameter: φ50 mm and a thickness: 5 mm was made as a sample for measuring heat-release performance.

For each of the composite materials thus obtained, a saturation magnetic flux density (T), a relative magnetic permeability μ and an iron loss (W/cm³) were measured. These results are shown in Table 4.

The saturation magnetic flux density is set to be a magnetic flux density obtained when a magnetic field of 10000 (Oe) (=795.8 kA/m) is applied to a ring-shaped composite material by means of an electromagnet and magnetic saturation is fully carried out.

The relative magnetic permeability was measured in the following manner. Wires having a primary side: 300 turns and a secondary side: 20 turns were applied to the ring-shaped composite material of each sample, a B–H initial magnetization curve was measured in a range of H=0 (0e) to 100 (0e), a maximum value of B/H of the B–H initial magnetization curve was obtained, and the maximum value was set to be the relative magnetic permeability μ. Herein, the magnetization curve is a so-called direct current magnetization curve.

The iron loss was calculated as follows. A hysteresis loss Wh (W/cm³) and an eddy current loss We (W/cm³) at an excitation magnetic flux density Bm: 1 kG (=0.1 T) and a measuring frequency: 10 kHz were measured by using a BH curve tracer for the ring-shaped composite material of each sample, and the hysteresis loss Wh+the eddy current loss We was calculated as the iron loss (W/cm³).

The resin component was removed to extract the magnetic powder from the obtained composite material, and particle size analysis of the obtained magnetic powder was carried out by the laser diffraction and scattering method in the same manner as described above. Consequently, a point for a particle size having a mode shown in Tables 1 and 2 had a peak in a histogram. The sample No. 1-1, No. 1-4, No. 1-5, and No. 1-8 to No. 1-10 had a plurality of peaks. In the composite material containing the nonmagnetic powder, the nonmagnetic powder had a minimum particle size having a peak in the particle size distribution. Moreover, the density ratio of the magnetic powder extracted from the obtained composite material was found in the same manner as described above. Consequently, the density ratio was substantially equal to the value shown in Tables 1 and 2. Accordingly, the magnetic powder in the composite material made in this test substantially maintains the particle size distribution and the density ratio of the powder used for the raw material.

TABLE 4

| Sample No. | Saturation Magnetic Flux Density (T) | Relative Magnetic Permeability μ | Iron Loss (W 1/10k) (W/cm³) |
|---|---|---|---|
| 1-1 | 1.25 | 29 | 497 |
| 1-2 | 1.17 | 17 | 460 |
| 1-3 | 1.17 | 18 | 472 |
| 1-4 | 1.22 | 24 | 462 |
| 1-5 | 1.1 | 28 | 185 |
| 1-6 | 1.05 | 16 | 165 |
| 1-7 | 1.05 | 17 | 173 |
| 1-8 | 1.08 | 22 | 170 |
| 1-9 | 1.28 | 33 | 432 |
| 1-10 | 1.24 | 30 | 393 |

As shown in Table 4, the samples having the magnetic powder constituted of the same material are compared with each other (comparison of the samples No. 1-1, No. 1-2, No. 1-3 and No. 1-4 or comparison of No. 1-5, No. 1-6, No. 1-7 and No. 1-8). A composite material having a relative magnetic permeability which is more than 20 and 35 or less has a higher saturation magnetic flux density as compared with the composite material which does not satisfy the relative magnetic permeability of more than 20 and 35 or less. In general, there is a tendency that the iron loss is increased with an increase in the saturation magnetic flux density when the saturation magnetic flux density is enhanced. However, in the sample having the relative magnetic permeability which is more than 20 and 35 or less, the iron loss associated with the increase in the saturation magnetic flux density is rarely increased or can be made comparatively small.

As shown in Table 4, moreover, it is found that the composite material including the magnetic powder of which particle size distribution has a plurality of peaks (the samples No. 1-1, No. 1-4, No. 1-5, No. 1-8, No. 1-9, No. 1-10) can easily have a relative magnetic permeability of more than 20 as compared with the composite material including the magnetic powder having a single peak (the samples No. 1-2, No. 1-3, No. 1-6, No. 1-7). Furthermore, as compared with the samples having the magnetic powder formed of the same material (comparison of the samples No. 1-1, No. 1-2, No. 1-3 and No. 1-4 or comparison of No. 1-5, No. 1-6, No. 1-7 and No. 1-8), the composite material including the magnetic powder of which particle size distribution has a plurality of peaks has a higher saturation magnetic flux density as compared with the composite material including the magnetic powder having a single peak (that is, a composite material including only one of the fine magnetic powder or the coarse magnetic powder). Moreover, it is found that the iron loss associated with an increase in the saturation magnetic flux density is rarely increased or can be made comparatively small in the composite material including the magnetic powder of which particle size distribution has a plurality of peaks. In addition, the saturation magnetic flux density of the composite material including the magnetic powder of which particle size distribution has a plurality of peaks (that is, powder including both the fine magnetic powder and the coarse magnetic powder) is greater than a value expected from an interpolation of the saturation magnetic flux density of the composite material including only the fine magnetic powder and the saturation magnetic flux density of the composite material including only the coarse magnetic powder. The reason why the result is obtained is unknown. By mixing both the fine magnetic powder and the coarse magnetic powder, however, it is supposed that a demagnetizing coefficient might be changed. Moreover, the reason why the composite material including the magnetic powder of which particle size distribution has a plurality of peaks has a low loss is supposed as follows. In other words, the fine magnetic powder is present at a high frequency so that an eddy current loss is reduced.

In addition, from the test, it is found that the saturation magnetic flux density is high when the pure iron powder is used, and the low loss is obtained without an insulating coating when the iron alloy is used. Moreover, it is found that a smaller particle size tends to have a lower loss regardless of the material from the comparison between "the samples No. 1-2 and No. 1-3" and between "the samples No. 1-6 and No. 1-7", for example.

Furthermore, it is found that the composite material containing the nonmagnetic powder has a lower loss from comparison between "the samples No. 1-1 and No. 1-4", between "the samples No. 1-5 and No. 1-8" and between "the samples No. 1-9 and No. 1-10", for example. The reason is supposed as follows. In other words, the magnetic powder and the nonmagnetic powder are uniformly present in the composite material, and a portion where more magnetic powder is locally present is not present substantially. Furthermore, it is found that the relative magnetic permeability is lower. The reason is supposed as follows. More specifically, the nonmagnetic particle is interposed between the magnetic particles in the composite material.

Referring to the prepared disk-shaped composite material, a thermal conductivity was measured by a temperature inclination method. Consequently, the thermal conductivity of the composite material including the fine/coarse mixed magnetic powder was higher than a maximum value in the case where only one of the fine magnetic powder and the coarse magnetic powder is used, and furthermore, was higher than a value expected from the interpolation. The reason is supposed as follows. More specifically, the fine magnetic particle is interposed between the coarse magnetic particles to form a continuous heat conducting path.

Third Embodiment

In the first embodiment, there is employed the configuration in which only a part of the magnetic core is constituted of the specific composite material. In addition, it is possible to employ a configuration in which all of the magnetic cores are constituted of the specific composite material, that is, a configuration in which a magnetic core constituted of the composite material according to the present invention is present on an inside and outside of a coil 2.

As a specific configuration, for example, a magnetic characteristic of a whole magnetic core is uniform. In other words, a saturation magnetic flux density of the whole magnetic core is 0.6 T or more (preferably 1.0 T or more) and a relative magnetic permeability is more than 20 and 35 or less (preferably is more than 20 and 30 or less), a content of the magnetic powder is more than 50% by volume and 75% by volume or less, and the same values are taken in optional portions of the magnetic core. Referring to this configuration, the relative magnetic permeability of the whole magnetic core is sufficiently low (35 or less at a maximum). Therefore, a gap member can be reduced more greatly, and preferably, a gapless structure can be employed. Accordingly, in this configuration, it is possible to further reduce the number of components and to decrease a size and a weight. In the case of the gapless structure, flux leakage from gap portions is not caused and an increase in the size of the reactor due to the presence of gaps can also be suppressed.

It is possible to manufacture the magnetic core according to this configuration by using the case 4 described in the first embodiment as a molding die, accommodating the coil 2 in a proper position of the case 4, then filling the case 4 with a mixture containing the magnetic powder and a polymeric material such as a resin, which are raw materials and curing the polymeric material such as a resin, for example. Referring to this configuration, the inner core and the outer core described in the first embodiment can be molded at the same time, and furthermore, their assembling and bonding steps or the like are not required so that productivity is high. According to this configuration, moreover, the case 4 is used as the molding die. Consequently, it is possible to easily form the magnetic core 3 regardless of a complicated shape. Also in this respect, the productivity is high. In a configuration in which the inside and the outside of the coil are covered with a composite material, furthermore, a coil can be protected by the polymeric component of the composite material. An external shape of the outer core typically conforms to an inner peripheral shape of the case 4.

Alternatively, the columnar compacts are fabricated by the specific composite material and the magnetic core can be built by utilizing at least one of the columnar compacts. For example, the inner core described in the first embodiment is set to be the columnar compact fabricated by the specific composite material, and the outer core can be manufactured by filling the case 4 with the mixture of the raw materials as described above. In this configuration, their assembling and bonding steps or the like of the inner core and the outer core are not required so that productivity is high. According to this configuration, moreover, the case 4 is used as the molding die. Consequently, it is possible to easily form the magnetic core (particularly, the outer core) regardless of a complicated shape. Also in this respect, the productivity is high. In a configuration in which the outside of the coil is covered with a composite material, furthermore, a coil can be protected by the polymeric component of the composite material. An external shape of the outer core typically conforms to an inner peripheral shape of the case 4.

Alternatively, it is possible to employ a configuration in which both the inner core and the outer core are used as the columnar compacts constituted of the specific composite material and these columnar compacts are assembled to form a magnetic core. Referring to this configuration, a gap member can be omitted or a case can be omitted. Accordingly, it is possible to reduce the number of components and to decrease a size and a weight. According to this configuration, moreover, it is sufficient that a mixture of one type is used for manufacturing the columnar compact. Therefore, preparation is easily carried out and productivity is high.

In all cases, it is possible to employ a configuration in which a magnetic characteristic of the magnetic core is partially varied by regulation of a material, a shape, a size, a content or the like of the magnetic powder. Referring to this configuration, in the case where the material of the magnetic powder is identical, the magnetic characteristic can easily be changed by the regulation of the content so that a composite material having a desirable characteristic can readily be manufactured. For example, it is possible to easily obtain a composite material having a high saturation magnetic flux density and a high relative magnetic permeability when a blending amount of the magnetic powder is increased, and it is possible to easily obtain a composite material having a low saturation magnetic flux density and a low relative magnetic permeability when the blending amount of the magnetic powder is decreased. A configuration in which the magnetic characteristic of the magnetic core is partially varied can easily be built through utilization of the columnar compact formed of at least one composite material described above and the composite material molded by using the case or utilization of only the columnar compact formed of a plurality of composite materials.

For example, the saturation magnetic flux density and the relative magnetic permeability in the composite material constituting the inner core can be caused to be higher than the saturation magnetic flux density and the relative magnetic permeability in the composite material constituting the outer core in the same manner as in the first embodiment through the regulation of the material, the content or the like of the magnetic powder. In this case, it is possible to reduce the size as described above. Alternatively, the saturation magnetic flux density and the relative magnetic permeability in the composite material constituting the outer core can be caused to be higher than the saturation magnetic flux density and the relative magnetic permeability in the composite material constituting the inner core. In this case, it is possible to reduce the leakage flux from the outer core to an outside, thereby decreasing a loss. In the case where the whole magnetic core is constituted of the composite material, thus, it is possible to easily vary the magnetic characteristics of the magnetic core partially by building at least a part of the magnetic core through the compact constituted of the composite material.

Fourth Embodiment

Contrary to the structure according to the first embodiment, it is possible to employ a configuration in which at least a part of a portion disposed on an inside of a tube-shaped coil formed by winding a wire in a magnetic core is constituted of the specific composite material and at least a part of a portion disposed on an outside of the coil is constituted of a powder compact. For example, a columnar compact constituted of the specific composite material (a content of magnetic powder: more than 50% by volume and 75% by volume or less, a saturation magnetic flux density: 0.6 T or more, preferably 1.0 T or more), a relative magnetic permeability: more than 20 and 35 or less, preferably more than 20 and 30 or less) is fabricated and is set to be an inner core, and an outer core is constituted of a powder compact. For example, the outer core includes a tube-shaped member disposed on an outer periphery of a coil and a plate-shaped member disposed on an each end surface of the coil. By combining the compact and the powder compact which are constituted of the composite material, it is possible to build a magnetic core. The magnetic core can have a configuration in which the relative magnetic permeability of the inner core including a polymeric component such as a resin is lower than that of the outer core, and the saturation magnetic flux density of the outer core constituted of the powder compact is higher than that of the inner core. By this structure, it is possible to reduce a leakage of a magnetic flux from the outer core to the outside, thereby decreasing a loss.

Fifth Embodiment

Although the vertical type configuration has been employed in the first embodiment, it is possible to employ a configuration (hereinafter referred to as a horizon type) in which a coil 2 is accommodated in a case 4 such that an axial direction of the coil is parallel with a bottom surface of the case 4. Referring to the horizontal configuration, a distance from an outer peripheral surface of the coil 2 to the bottom surface of the case 4 is shorted so that heat-release performance can be enhanced.

Sixth Embodiment

Although the configuration in which the single coil is provided has been employed in the first embodiment, it is possible to employ a configuration in which a coil 2 having a pair of coil elements 2a and 2b which are formed by spirally winding a single continuous wire 2w as in a reactor 15 shown in FIG. 3(A) and an annular-shaped magnetic core 3 where these coil elements 2a and 2b are disposed (FIG. 3(B)) are provided.

The coil 2 typically takes a configuration in which both of the coil elements 2a and 2b are horizontally disposed side by side such that the axial directions of the respective coil elements 2a and 2b are parallel with each other, and are coupled to each other through a coupling portion 2r formed by folding back a part of the wire 2w. Examples of the other coil include a configuration in which the respective coil elements 2a and 2b are separately formed by means of two different wires, and ends of the wires constituting the respective coil elements 2a and 2b are bonded and integrated by welding, pressure bonding, soldering or the like. The coil elements 2a and 2b are formed into a hollow tube shape with the same winding number in the same winding direction.

The magnetic core 3 has a pair of columnar inner cores 31 and 31 disposed respectively at the inside of the respective coil elements 2a and 2b and a pair of columnar outer cores 32 and 32 disposed on the outside of the coil 2 and exposed from the coil 2. End surfaces of both of the inner cores 31 and 31 disposed apart from each other are coupled to each other through one of the outer cores 32 and the other end surfaces of both of the inner cores 31 and 31 are coupled to each other through the other outer core 32 as shown in FIG. 3(B) so that the magnetic core 3 is formed into an annular shape.

In addition, the reactor 15 includes an insulator 5 for enhancing insulation performance between the coil 2 and the magnetic core 3. The insulator 5 includes a pair of tube-shaped portions (not shown) disposed on the outer peripheries of the columnar inner cores 31 and 31 and a pair of frame plate portions 52 abutting on the end surface of the coil 2 (a surface where a turn is seen like an annular shape) and having two through holes (not shown) where the inner cores 31 and 31 are inserted. For a constituting material of the insulator 5, it is possible to utilize an insulating material such as a PPS resin, a PTFE resin or LCP. It is also possible to employ a configuration in which the insulator 5 is not provided.

Referring to the reactor 15 including the coil elements 2a and 2b, at least a part of the magnetic core 3 is constituted of a specific composite material. More specifically, the composite material satisfies a content of magnetic powder: more than 50% by volume and 75% by volume or less, a saturation magnetic flux density: 0.6 T or more, preferably 1.0 T or more, a relative magnetic permeability: more than 20 and 35 or less, and preferably more than 20 and 30 or less.

As a specific configuration of the magnetic core 3, for example, it is possible to employ a configuration in which the composite material and a magnetic material in the other configuration (a lamination product of a powder compact and an electromagnetic steel sheet) (that is, a configuration in which a part of the magnetic core is constituted of the composite material according to the present invention) as described in the first embodiment. This configuration can easily vary the magnetic characteristics of the magnetic core partially in the same manner as in the first embodiment.

For example, it is possible to employ a configuration in which the inner cores 31 and 31 to be inserted into the coil elements 2a and 2b respectively are constituted of a powder compact and the outer cores 32 and 32 are constituted of a columnar compact formed of the specific composite material. Referring to this configuration, it is possible to build the annular-shaped magnetic core 3 by assembling the powder compact and the columnar compact formed of the composite material. In this configuration, a gap member can be omitted or a case can be omitted. Accordingly, it is possible to reduce the number of components and to decrease a size and a weight. In this configuration, the saturation magnetic flux density and the relative magnetic permeability of the inner core 31 are higher than the saturation magnetic flux density and the relative magnetic permeability of the outer core 32.

As another configuration, it is possible to employ a configuration in which the assembly of the coil elements 2a and 2b and the powder compact are covered with the specific composite material as in the first embodiment. In this configuration, a case (not shown) is used as a molding die and the assembly of the coil 2 and the inner cores 31 and 31 is accommodated in the case, the case is then filled with a mixture to be a raw material, and a polymeric material such as a resin is cured so that the composite material can be manufactured (at this time, the reactor 15 can also be manufactured) in the same manner as in the first embodiment. The composite material is molded to couple the inner cores 31 and 31 and builds the outer core 32. Therefore, their assembling and bonding steps or the like are not required so that productivity is high. By using the case as the molding die, moreover, the composite material can easily form the magnetic core regardless of a complicated shape. Also in this respect, the productivity is high. In a configuration in which the outside of the coil is covered with the composite material, furthermore, a coil can be protected by the polymeric component of the composite material. An external shape of the outer core typically conforms to an inner peripheral shape of the case.

In these configurations, the saturation magnetic flux densities of the inner cores 31 and 31 constituted of the powder compact to be inserted into the coil elements 2a and 2b are higher than those of the outer cores 32 and 32 constituted of the composite material containing the polymeric material such as a resin as described above. Therefore, it is possible to reduce a size of the inner core 31. Accordingly, this configuration can reduce (1) a size of the reactor, (2) a weight of the reactor by shortening the wire 2w, and the like.

Alternatively, it is possible to take a configuration in which the inner cores 31 and 31 to be inserted into the coil elements 2a and 2b respectively are constituted of the columnar compacts formed of the specific composite material and the outer cores 32 and 32 are constituted of the powder compact. This configuration can build the annular-shaped magnetic core 3 by assembling the columnar compact constituted of the composite material and the powder compact.

In the configuration, the relative magnetic permeability of the inner core 31 containing the polymeric component such as a resin is lower than the relative magnetic permeability of the outer core 32 disposed on the outside of the coil elements 2a and 2b, and the saturation magnetic flux density of the outer core 32 formed of the powder compact is higher than the saturation magnetic flux density of the inner core 31. By this structure, a leakage of a magnetic flux from the outer core 32 to the outside can be reduced so that a loss can be reduced.

In the case where a part of the magnetic core 3 is provided with a magnetic material having a high relative magnetic permeability, for example, a powder compact or a lamination product of electromagnetic steel sheets, a gap material constituted of a material having a lower magnetic permeability than a core piece 31m (typically, a nonmagnetic material such as alumina) is permitted to be provided between the core pieces 31m formed of the powder compact, the composite material or the like or in the middle of the individual core pieces 31m in order to regulate an inductance. In the example shown in FIG. 3(B), both the inner core 31 and the outer core 32 are set to be only the core piece 31m. For the gap material, it is also possible to use a nonmagnetic material as well as a magnetic material having a relative magnetic permeability which is 1.05 or more and 2 or less. Examples of the magnetic material include a mixture including a nonmagnetic material such as a polyphenylene sulfide (PPS) resin and a magnetic material such as iron powder, and the like.

As described in the third embodiment, alternatively, it is possible to employ a configuration in which all of the magnetic cores 3 disposed on the inside and the outside of the coil elements 2a and 2b are constituted of the specific composite material. The magnetic core 3 according to this configuration satisfies a content of magnetic powder: more than 50% by volume and 75% by volume or less, a saturation magnetic flux density: 0.6 T or more, preferably, 1.0 T or more, a specific magnetic permeability: more than 20 and 35 or less, and preferably more than 20 and 35 or less in an optional portion. In other words, both the inner core 31 and the outer core 32 have the contents, the saturation magnetic flux densities and the relative magnetic permeabilities which satisfy specific ranges. In this configuration, the whole magnetic core 3 has a relative magnetic permeability which is 35 or less. In this configuration, therefore, a gap member can be reduced more greatly, and preferably, a gapless structure can be employed, the number of components can further be reduced and a size and a weight can be decreased. In the case of a gapless structure, flux leakage from gap portions is not caused and an increase in the size of the reactor due to the presence of gaps can also be suppressed.

As a more specific configuration, it is possible to employ a configuration in which the material of the whole magnetic core 3 is uniform. This configuration can be manufactured by using a case (not shown) as a molding die, accommodating the coil 2 in a proper position of the case, then filling the case with a mixture to be a raw material and curing a polymeric material such as a resin, for example. Referring to this configuration, the inner core 31 and the outer core 32 can be molded at the same time, and furthermore, their assembling and bonding steps or the like are not required so that productivity is high. According to this configuration, moreover, the case is used as the molding die. Consequently, it is possible to easily form the magnetic core 3 regardless of a complicated shape. Also in this respect, the productivity is high. In a configuration in which the inside and the outside of the coil are covered with a composite material, furthermore, a coil can be protected by the polymeric component of the composite material. An external shape of the outer core typically conforms to an inner peripheral shape of the case.

As described in the third embodiment, alternatively, it is possible to fabricate columnar compacts by the specific composite material and to build the magnetic core 3 by utilizing at least one of the columnar compacts. For example, the inner cores 31 and 31 are set to be the columnar compacts fabricated by the specific composite material, and the outer core can be manufactured by using the case (not shown) as a molding die, and filling the case with the mixture of the raw materials as described above. The outer core is molded to couple the inner cores 31 and 31. For this reason, their assembling and bonding steps or the like are not required so that productivity is high. The case is used as the molding die. Consequently, it is possible to easily form the magnetic core 3 (particularly, the outer core 32) regardless of a complicated shape. Also in this respect, the productivity is high. In a configuration in which the outside of the coil is covered with a composite material, furthermore, a coil can be protected by the polymeric component of the composite material. An external shape of the outer core typically conforms to an inner peripheral shape of the case.

Alternatively, it is possible to employ a configuration in which both the inner cores 31 and 31 and the outer cores 32 and 32 are used as the columnar compacts constituted of the specific composite material and these columnar compacts are assembled to form the magnetic core 3. Referring to this configuration, a gap member can be omitted or a case can be omitted. Accordingly, it is possible to reduce the number of components and to decrease a size and a weight. According to this configuration, moreover, it is sufficient that a mixture of one type is used for manufacturing the columnar compact. Therefore, preparation is easily carried out and productivity is high.

As another configuration, it is possible to employ a configuration in which a magnetic characteristic of the magnetic core 3 is partially varied by regulation of a material, a shape, a size, a content or the like of the magnetic powder as described in the third embodiment. Referring to this configuration, in the case where the material of the magnetic powder is identical, the magnetic characteristic can easily be changed by the regulation of the content so that a composite material having a desirable characteristic can readily be manufactured. For example, it is possible to easily obtain a composite material having a high saturation magnetic flux density and a high relative magnetic permeability when a blending amount of the magnetic powder is increased, and it is possible to easily obtain a composite material having a low saturation magnetic flux density and a low relative magnetic permeability when the blending amount of the magnetic powder is decreased. As described above, it is possible to easily build this configuration through utilization of the columnar compact formed of at least one composite material and the composite material molded by using the case or utilization of only the columnar compact formed of a plurality of composite materials.

For example, the saturation magnetic flux density and the relative magnetic permeability in the composite material constituting the inner cores 31 and 31 can be made higher than the saturation magnetic flux density and the relative magnetic permeability in the composite material constituting the outer cores 32 and 32 through the regulation of the material, the content or the like of the magnetic powder. Accordingly, the size of the inner core can be reduced. Therefore, a size reduction can be achieved. Alternatively, the saturation magnetic flux density and the relative magnetic permeability in the composite material constituting the outer cores 32 and 32 can be made than the saturation magnetic flux density and the relative magnetic permeability in the composite material constituting the inner cores 31 and 31. In this case, it is possible to reduce the leakage of the magnetic flux from the outer core to an outside, thereby decreasing a loss.

Seventh Embodiment

The reactor according to the first to sixth embodiments may be used for a component of a converter mounted on a vehicle or the like, or a component of a power conversion device including the converter.

Figure 4:
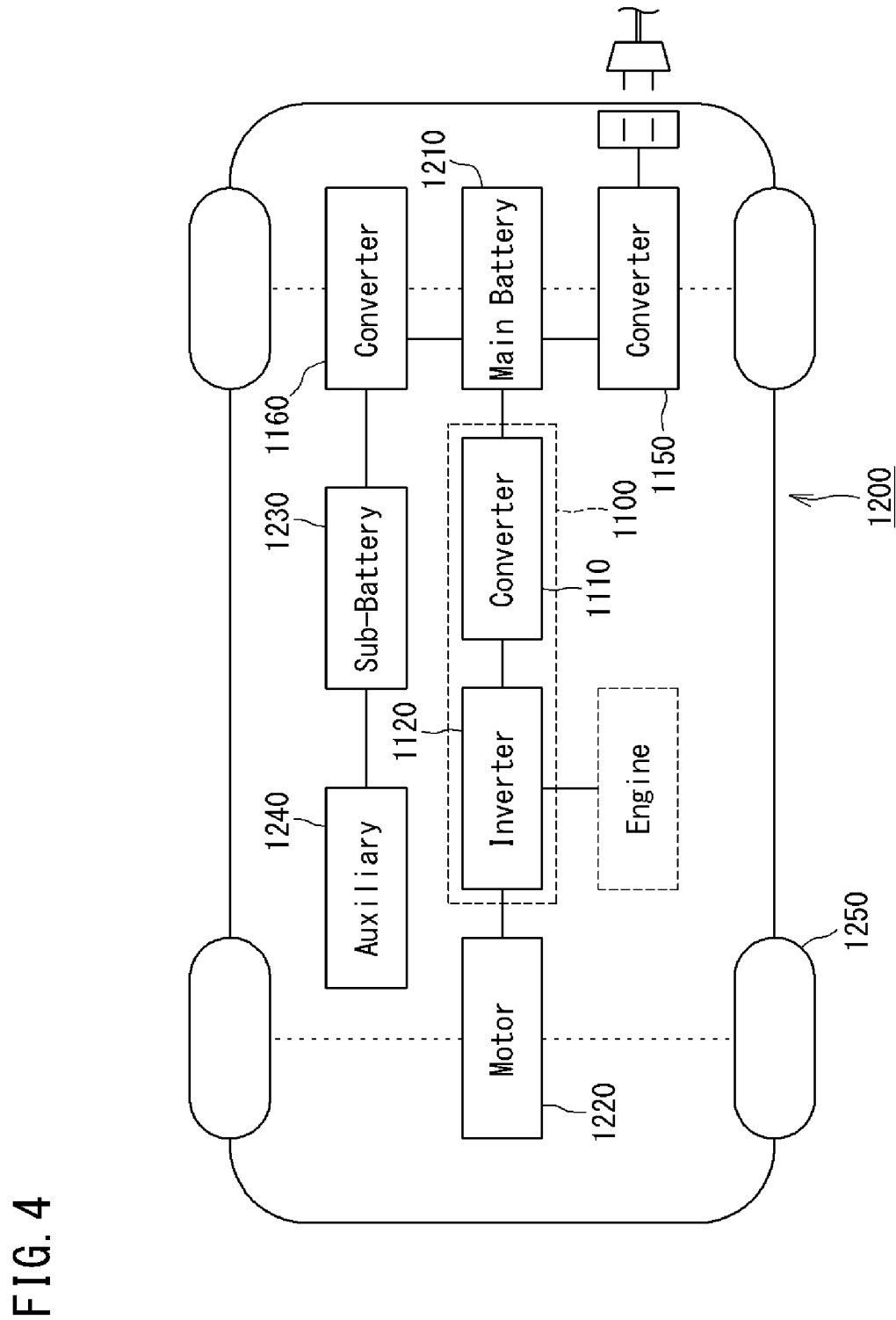
FIG. 4 is a brief structure diagram schematically showing a power supply system of a hybrid electric vehicle.

For example, as shown in FIG. 4, a vehicle 1200, which is a hybrid electric vehicle or an electric vehicle, includes a main battery 1210, a power conversion device 1100 connected to the main battery 1210, and a motor (a load) 1220 driven by power fed from the main battery 1210 and used for traveling. The motor 1220 is typically a three-phase alternating current motor. The motor 1220 drives wheels 1250 during traveling and functions as a generator during regeneration. In case of a hybrid electric vehicle, the vehicle 1200 includes an engine in addition to the motor 1220. FIG. 4 illustrates an inlet as a charging portion of the vehicle 1200; however, a plug may be included.

The power conversion device 1100 includes a converter 1110 connected to the main battery 1210, and an inverter 1120 that is connected to the converter 1110 and performs conversion between direct current and alternating current. During traveling of the vehicle 1200, the converter 1110 steps up a direct-current voltage (input voltage) of the main battery 1210, which is in a range from about 200 to 300 V, to a level in a range from about 400 to 700 V, and then feeds the power to the inverter 1120. Also, during regeneration, the converter 1110 steps down the direct-current voltage (the input voltage) output from the motor 1220 through the inverter 1120 to a direct-current voltage suitable for the main battery 1210, and then uses the direct-current voltage for the charge of the main battery 1210. During traveling of the vehicle 1200, the inverter 1120 converts the direct current stepped up by the converter 1110 into predetermined alternating current and feeds the alternating current to the motor 1220. During regeneration, the inverter 1120 converts the alternating current output from the motor 1220 into direct current and outputs the direct current to the converter 1110.

Figure 5:
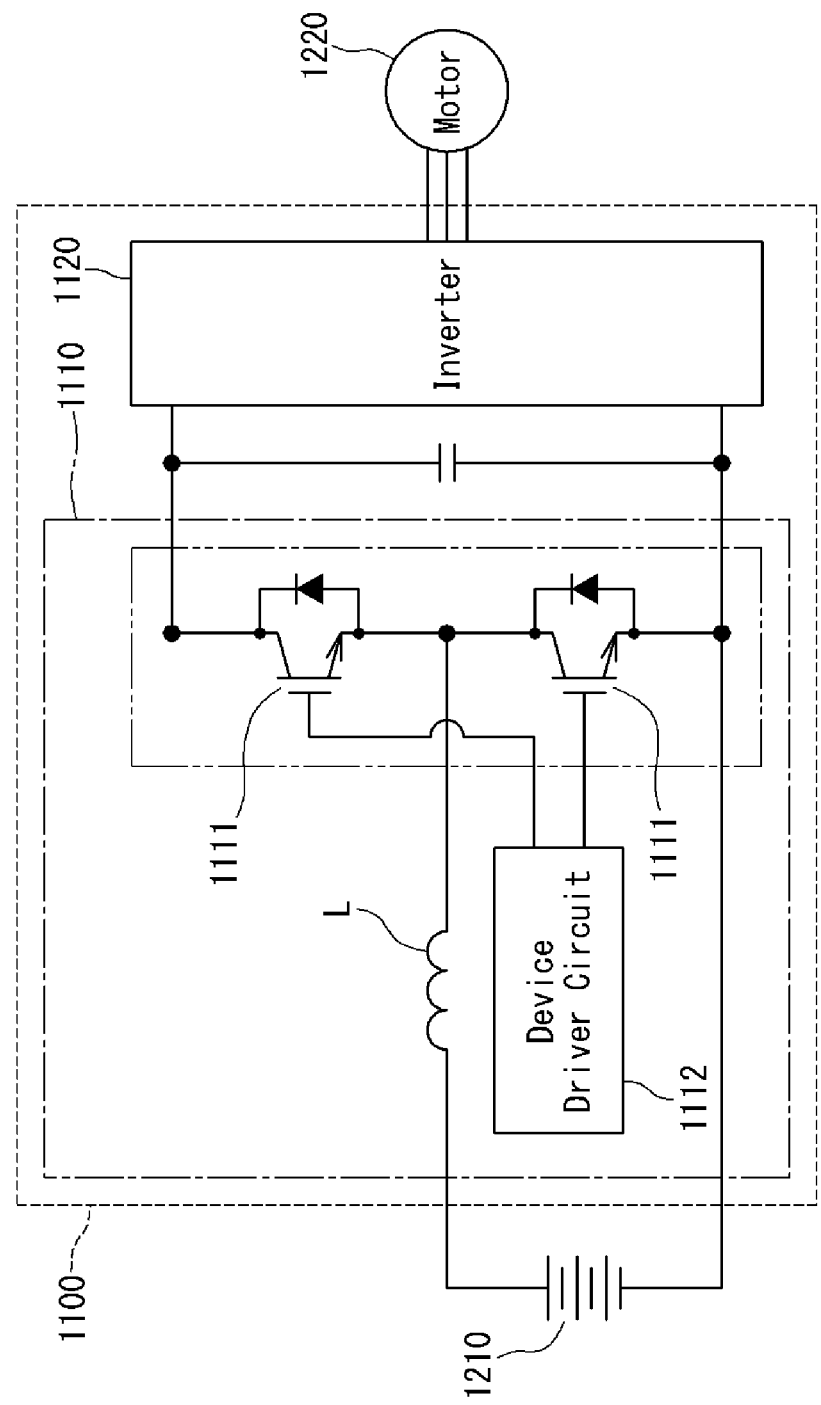
FIG. 5 is a brief circuit diagram showing an example of a power conversion device according to the present invention including a converter according to the present invention.

As shown in FIG. 5, the converter 1110 includes a plurality of switching elements 1111, a driving circuit 1112 that controls operations of the switching elements 1111, and a reactor L. The converter 1110 converts the input voltage (in this situation, performs step up and down) by repetition of on and off operations (switching operations). The switching elements 1111 each use a power device, such as field effect transistor (FET) or an insulated-gate bipolar transistor (IGBT). The reactor L uses a characteristic of a coil that disturbs a change of current which flows through the circuit, and hence has a function of making the change smooth when the current is increased or decreased by the switching operation. The reactor L is the reactor according to the first to sixth embodiments. The number of components is small so that a loss can be reduced. By including the reactor 1 and the like, the power conversion device 1100 and the converter 1110 are excellent in productivity and have a low loss.

The vehicle 1200 includes, in addition to the converter 1110, a feeding device converter 1150 connected to the main battery 1210, and an auxiliary power supply converter 1160 that is connected to a sub-battery 1230 serving as a power source of an auxiliary 1240 and the main battery 1210 and that converts a high voltage of the main battery 1210 to a low voltage. The converter 1110 typically performs DC-DC conversion, whereas the feeding device converter 1150 and the auxiliary power supply converter 1160 perform AC-DC conversion. The feeding device converter 1150 may include a kind that performs DC-DC conversion. The feeding device converter 1150 and the auxiliary power supply converter 1160 each may include a configuration similar to the reactor according to the first to sixth embodiments, and the size and shape of the reactor may be properly changed. Also, the reactor according to the first to sixth embodiments may be used for a converter that performs conversion for the input power and that performs only stepping up or stepping down.

The present invention is not limited to the above-described embodiments, and may be properly modified without departing from the scope of the invention. For example, the composite material according to the present invention can be utilized in a core for a motor.

INDUSTRIAL APPLICABILITY

The composite material according to the present invention can be utilized for a material constituting a magnetic core to be used for a magnetic part including a coil, for example, a reactor, a motor or the like. The reactor according to the present invention can be utilized for a component of a power conversion device such as a bidirectional DC-DC converter or a converter of an air conditioner which is mounted on a vehicle such as a hybrid electric vehicle, a plug-in hybrid electric vehicle, an electric vehicle or a fuel cell vehicle.

REFERENCE SIGNS LIST 1, 15: REACTOR
2: COIL
2w: WIRE
2a, 2b: COIL ELEMENT
2r: COUPLING PORTION
3: MAGNETIC CORE
31: INNER CORE
31m: CORE PIECE
32: OUTER CORE
4: CASE
41: MOUNT PORTION
5: INSULATOR
52: FRAME PLATE PORTION
1100: POWER CONVERSION DEVICE
1110: CONVERTER
1111: SWITCHING ELEMENT
1112: DRIVING CIRCUIT
L: REACTOR
1120: INVERTER
1150: FEEDING DEVICE CONVERTER
1160: AUXILIARY POWER SUPPLY CONVERTER
1200: VEHICLE
1210: MAIN BATTERY
1220: MOTOR
1230: SUB-BATTERY
1240: AUXILIARY
1250: WHEEL

The claims are as follows:

1. A composite material comprising magnetic powder and a polymeric material including the powder in a dispersion state, wherein
    the magnetic powder consists of a plurality of particles constituted of the same material as pure iron powder,
    a plurality of peaks is present when a particle size distribution of the magnetic powder is taken, the plurality of peaks having first and second peaks in the particle size distribution represented by particle diameters r1 and r2, respectively, and satisfying $r1 \leq (\frac{1}{2}) \times r2$,
    the particle diameter r1 is 50 micrometers or more and 100 micrometers or less, and the particle diameter r2 is 100 micrometers or more and 150 micrometers or less,
    a content of the magnetic powder with respect to the whole composite material is more than 50% by volume and 75% by volume or less,
    a saturation magnetic flux density of the composite material is 0.6 T or more, and
    a relative magnetic permeability of the composite material is more than 20 and 35 or less.

2. The composite material according to claim 1, wherein a density ratio of the magnetic powder is 0.38 or more and 0.65 or less, and
    the density ratio is set to be an apparent density/a true density.

3. The composite material according to claim 1, wherein an apparent density of the magnetic powder is 3.0 g/cm$^3$ or more and 5.0 g/cm$^3$ or less.

4. The composite material according to claim 1, wherein a degree of circularity of the particle constituting the magnetic powder is 1.0 or more and 2.0 or less.

5. A reactor comprising a coil and a magnetic core, wherein
    at least a part of the magnetic core is constituted of the composite material according to claim 1.

6. A reactor comprising a coil and a magnetic core, wherein
    the whole magnetic core is constituted of the composite material according to claim 1.

7. A converter comprising the reactor according to claim 5.

8. A power conversion device comprising the converter according to claim 7.

9. A converter comprising the reactor according to claim 6.

10. A power conversion device comprising the converter according to claim 9.

* * * * *